(12) United States Patent
Goldfine et al.

(10) Patent No.: US 7,411,390 B2
(45) Date of Patent: Aug. 12, 2008

(54) HIGH RESOLUTION INDUCTIVE SENSOR ARRAYS FOR UXO

(75) Inventors: Neil J. Goldfine, Newton, MA (US);
Darrell E. Schlicker, Watertown, MA (US); Ian C. Shay, Cambridge, MA (US); Andrew P. Washabaugh, Chula Vista, CA (US)

(73) Assignee: JENTEK Sensors, Inc., Waltham, MA (US)

( * ) Notice: Subject to any disclaimer, the term of this patent is extended or adjusted under 35 U.S.C. 154(b) by 931 days.

(21) Appl. No.: 10/454,383

(22) Filed: Jun. 3, 2003

(65) Prior Publication Data

US 2004/0021461 A1 Feb. 5, 2004

Related U.S. Application Data

(60) Provisional application No. 60/385,930, filed on Jun. 4, 2002, provisional application No. 60/468,828, filed on May 8, 2003, provisional application No. 60/470,143, filed on May 13, 2003.

(51) Int. Cl.
  *G01N 27/72* (2006.01)
  *G01N 27/82* (2006.01)
  *G01R 33/12* (2006.01)
(52) U.S. Cl. .................. 324/243; 324/202; 324/242
(58) Field of Classification Search .............. 324/222, 324/326, 329, 228–243, 261–263, 202
See application file for complete search history.

(56) References Cited

U.S. PATENT DOCUMENTS

| | | | | |
|---|---|---|---|---|
| 2,557,994 A | * | 6/1951 | Ostlund ...................... | 324/327 |
| 4,270,545 A | * | 6/1981 | Rodler ........................ | 600/407 |
| 5,389,876 A | * | 2/1995 | Hedengren et al. .......... | 324/242 |
| 5,793,206 A | * | 8/1998 | Goldfine et al. .............. | 324/242 |
| 6,534,985 B2 | * | 3/2003 | Holladay et al. ............. | 324/334 |
| 6,690,170 B2 | * | 2/2004 | Homan et al. ............... | 324/339 |

OTHER PUBLICATIONS

H.A. Haus and J.R Melcher, "Electromagnetic Fields and Energy," Prentice Hall, Englewood Cliffs, NJ, 1989.

SERDP Proposal, titled "High Resolution Inductive Sensor Arrays for UXO Detection, Identification and Clutter Suppression," SON No. UXSON-02-03, dated Apr. 17, 2002.

(Continued)

*Primary Examiner*—Reena Aurora
*Assistant Examiner*—Kenneth J Whittington
(74) *Attorney, Agent, or Firm*—Hamilton, Brook, Smith & Reynolds, P.C.

(57) ABSTRACT

For the inspection of materials and the detection and characterization of hidden objects, features, or flaws sensors and sensor arrays are used to image form two-dimensional images suitable for characterizing the hidden features. Magnetic field or eddy current based inductive and giant magnetoresistive sensors may be used on magnetizable and conducting materials, while capacitive sensors can be used for dielectric materials. Enhanced drive windings and electrode structures permit nulling or cancellation of local fields in the vicinity of the sense elements to increase sensor sensitivity. The addition of calibration windings, which are not energized during measurements, allows absolute impedance and material property measurements with nulled sensors. Sensors, sensor arrays, and support fixtures are described which permit relative motion between the drive and sense elements. This facilitates the volumetric reconstruction of hidden features and objects.

23 Claims, 32 Drawing Sheets

OTHER PUBLICATIONS

Air Force Phase I Proposal, titled "Capacitive and Inductive Arrays for Metallic and Non-Metallic Object Imaging," Topic #AF-03-123, dated Jan. 14, 2003.

Air Force Phase II Proposal, titled "Three Dimensional Magnetic Imaging of Damage in Multiple Layer Aircraft Structures," Topic #AF02-281, dated Feb. 20, 2003.

Navy Phase I Proposal, titled "Observability Enhancement and Uncertainty Mitigation for Engine Rotating Component PHM," Topic #N02-188, dated Aug. 14, 2002.

Technical Report titled "High Resolution Inductive Sensor Arrays for UXO Detection, Identification and Clutter Suppression," SERDP Base Program Final Report, dated Apr. 15, 2003.

Technical presentation titled "High Resolution Inductive Sensor Arrays for UXO Detection, Identification and Clutter Suppression," presented to the SERDP Scientific Advisory Board, Jun. 11, 2002.

Technical paper titled "High Resolution Inductive Sensor Arrays for UXO Detection, Identification and Clutter Suppression," SPIE AeroSense Conference, Orlando, FL, Apr. 23, 2003.

Technical presentation titled "High Resolution Inductive Sensor Arrays for UXO Detection, Identification and Clutter Suppression," In-Progress Review meeting for SERDP, May 14, 2003.

Technical paper titled "MWM Eddy Current Sensor Array Imaging of Surface and Hidden Corrosion for Improved Fleet Readiness and Cost Avoidance," presented at U.S. Army Corrosion Conference, Clearwater Beach; FL, Feb. 11-13, 2003.

Technical paper titled "MWM Eddy Current Sensor Array Characterization of Aging Structures Including Hidden Damage Imaging," presented at the NACE Conference, San Diego; CA, Mar. 17-19, 2003.

Technical paper titled "Material Condition Monitoring Using Embedded and Scanning Sensors for Prognostics," presentation at the 57th MFPT Conference, Virginia Beach, VA; Apr. 2003.

Technical paper titled "Nondestructive Evaluation for CBM and PHM of Legacy and New Platforms," 57th MFPT Conference, Virginia Beach, VA; Apr. 2003.

Technical paper titled "Validation of Multi-Frequency Eddy Current MWM Sensors and MWM-Arrays for Coating Production Quality and Refurbishment Assessment," submitted for the proceedings of the ASME/IGTI Turbo conference, Jun. 2003, Atlanta, GA.

Technical paper titled "Corrosion Detection and Prioritization Using Scanning and Permanently Mounted MWM Eddy-Current Arrays", Tri-Service Corrosion Conference, Jan. 2002.

Technical paper titled "MWM-Array Characterization and Imaging of Combustion Turbine Components," presented at EPRI International Conference on Advances in Life Assessment and Optimization of Fossil Fuel Power Plants, Mar. 2002.

Technical paper titled "Absolute Electrical Property Imaging Using High Resolution Inductive, Magnetoresistive and Capacitive Sensor Arrays for Materials Characterization," presented at 11th International Symposium on Nondestructive Characterization of Materials, Berlin, Germany; Jun. 2002.

Technical paper titled "High-Resolution, Deep Penetration and Rapid GMR/Eddy Current Array Imaging of Weld Condition and Quality" presented at ASNT Structural Materials Technology—NDE/NDT for Highways and Bridges, Sep. 2002.

Technical paper titled "Multi-Site Damage Imaging of 3rd Layer Cracks in Lap Joints using MWM-Arrays," presented at the 6th Joint FAA/DoD/NASA Aging Aircraft Conference, Sep. 2002.

* cited by examiner

HIGH RESOLUTION INDUCTIVE SENSOR ARRAYS FOR UXO

RELATED APPLICATIONS

This application claims the benefit of U.S. Provisional Application No. 60/385,930, filed Jun. 4, 2002, U.S. Provisional Application No. 60/468,828, filed May 8, 2003, and U.S. Provisional Application No. 60/470,143, filed May 13, 2003. The entire teachings of the above applications are incorporated herein by reference.

GOVERNMENT SUPPORT

The invention was supported, in whole or in part, by contract number DACA72-03-C0001 from the SERDP. The Government has certain rights in the invention.

BACKGROUND OF THE INVENTION

The technical field of this invention is that of nondestructive materials characterization. This includes inspection of materials for hidden objects and characterization of surface, near-surface, and bulk material condition for flat and curved parts or components using magnetic field based or eddy-current sensors. A specific inspection application is the need for detection of hidden damage in complex and thick structures. This specifically includes detection of deeply buried cracks under fasteners, but also related applications that require imaging of complex constructs, such as hidden corrosion-fatigue (e.g., fatigue cracks initiating from buried corrosion damage), or hidden corrosion in difficult to inspect locations such as the F-15 wing or C-130 longeron. Another application is the detection and identification of hidden objects such as unexploded ordnance, where false indications from harmless clutter need to be suppressed in order for site remediation efforts to be effective.

The capability of existing technologies to discriminate between harmful unexploded ordnance (UXO) and harmless clutter continues to limit the efficacy of UXO remediation. These remediation sites include live ammunition testing ranges, mine fields, and areas of past military actions. Inductive sensors with a single sensing coil are commonly used for detection. These single coil methods often detect all relevant metal objects but generally cannot discriminate between UXO and harmless clutter. Also, research into model based methods, using such single coil sensors, to discriminate between UXO and clutter have shown limited success when variations in the orientation, material types, and damage are considered, even in the absence of clutter. False indications continue to far outnumber verified detections so that site reclamation is typically a slow and costly process.

According to the United Nations, there are over 100 million land mines currently deployed in more than 60 countries. The mines themselves range from large anti-tank mines to small anti-personnel mines and from all metal construction to primarily plastic or even wood. Triggering mechanisms range from direct pressure, to trip wires, to magnetic sensors and fiber optics. In addition, millions of bomblets have been deployed as Cluster Bomb Units (CBUs) during wars and military actions. A significant number of these failed to explode and continue to threaten the populations indigenous to the original combat zones. Being largely constructed of metal, unexploded bomblets are readily detectable with existing hand-held metal detectors. However, current metal detectors have no way of discriminating an intact bomblet, which may be buried at depths up to 1 m (39 in.), from a bomblet fragment or other pieces of shrapnel or metallic debris that is near the surface.

The US Army currently has a deployed mine detector called the AN/PSS-12. This is an inductive type detector that utilizes the creation of eddy currents in a metallic object to alter the impedance of the search coil. This detector has served the Army well, but to be reliably detected the object or mine must be directly beneath the search head and must contain some metal. Other methods such as ground penetrating radar, infrared, acoustic, thermal, and x-ray, have been investigated to solve the problem of detecting low-metal and no-metal mines.

SUMMARY OF THE INVENTION

Aspects of this invention relate to apparatus and methods for the inspection of materials and the detection and characterization of hidden objects or features within these materials. Magnetic field sensors and sensor arrays are best suited to the inspections for magnetic or conducting materials while electric field sensors and sensor arrays are best suited to inspections for dielectric or insulating materials. For objects or features, characteristics such as size, depth orientation, geometry, electric and magnetic material properties, and number of objects are to be determined.

In one embodiment, distortion of images created by scanning a sensor over a test material are compensated to correct for any non-uniform sensor responses over the test area. Preferably, a measurement is performed on an area with known or constant properties so that the irregularities in the sensor response can be readily discerned. The measurement data is then processed or compensated so that the correct image results. Alternatively, a model can be used for the expected response and used to compensate the data. The compensation can involve scaling the image axes or normalizing by dividing the measured response by a known response. This can be done with a sensor array and with magnetic and electric field sensing approaches. In one embodiment, an object is hidden in the test material.

In a preferred embodiment, sensor arrays are used which have a drive structure capable of creating an interrogating field that penetrates deep into the test materials and also a bucking coil for canceling the field in the vicinity of the sense elements. This permits additional amplification of the sense signal without saturation of the instrumentation by strong direct coupling to the drive structure. Preferably, the sensor uses magnetic fields and the sense elements form a linear array parallel to at least one straight drive electrode, so that scanning in a direction perpendicular to the array direction readily creates a scan image. In one embodiment, the local magnetic field is nulled in the vicinity of the sense elements. In one embodiment, the sense elements are inductive coils. These coils can respond to absolute property variations or differential properties such as figure-eight loops. In another embodiment, the sense elements are giant magnetoresistive (GMR) sensors, which permit low frequency operation as they respond to the magnetic flux as opposed to the time rate of change of flux like inductive coils.

In a preferred embodiment, a single bucking coil surrounds all of the sense elements. This provides the nulling of the sense elements without too many extra drive loops. In one embodiment, the bucking coil is driven in series with the primary drive winding, which ensures a null in the local field if the drive and bucking coils have been designed accordingly. Alternatively, passive elements such as resistors can be inserted in to the drive circuit to attenuate or phase shift the current into the bucking coil to null the local field. In another alternative embodiment, the bucking coil is actively driven separately from the primary winding. This permits greater control over the bucking coil response and can extend the dynamics range of operation. The current to the bucking coil can become another measured parameter so that the effect of the field from the bucking coil can be property accounted for in the measurement. In another embodiment, the sensor arrays also include a calibration coil that has separate electrical connections from the primary and bucking coil. The response of the sensing elements to this coil should be known so that absolute properties can be obtained. Preferably, the calibration coil is behind the area spanned by the sense element and far enough away from the sense elements to have a minimal effect on the measurement response when an inspection is being performed.

In yet another embodiment, a sensor array having a primary winding, bucking coil, and calibration coil is calibrated by measuring the response of each sense element as the calibration coil and primary winding are successively energized. Preferably, the current through the primary winding is attenuated so that the instrumentation electronics are not saturated during the measurements. The calibration procedure can involve determining an offset and a scale factor that converts the measurement data into an expected response.

In one embodiment, the sensor is incorporated into a support structure that permits local motion of the sensor even when the support structure or cart is stationary. This helps to minimize any effects that the mechanical motion or vibrations from the cart may have on the measurement. In one embodiment, the sensor has an array of sensor elements. This motion can include simple linear motion along the material surface, vertical motion where the lift-off distance between the sensor and the material surface is varied, rotation of the sense element so that the orientation of the sense element can be varied to enhance sensitivity to particular components of the magnetic field, and complex motions involving combinations of the other motions. More specifically, the sensor has a linear array of sense elements. In one embodiment, the sensor uses a magnetic field to interrogate the test material and in another, an electric field is used. In another embodiment, the support structure permits relative motion between the drive and sense elements for the sensor.

In another embodiment, a sensor is designed to have relative motion between the sense elements and the drive winding. As a simple case, the primary winding and sense elements can be made using flexible circuit microfabrication techniques onto separate substrates. Measurements can then be performed as the primary winding is placed near the test material and the sense elements are slid over the primary winding substrate. Measurements can also be performed at multiple primary winding positions over the test material surface. The sense elements can be a linear array parallel to straight segment of the primary winding and may include inductive coils or GMR sensors. Each sense element can provide absolute or differential responses. For reference, or for taking the differential response, a second set of sense elements and drive windings, which match the geometry and relative positions of the first set, can also be used. This second set of sense elements would slide along with the first set and provide an accurate reference response.

In one embodiment, the sensor responses are used to create a volumetric representation of the material properties by assigning an equivalent source to voxel elements in the volume of interest. Large local variations in the equivalent sources reflect large material property changes that can be associated with a feature, such as an object, multiple objects, a flaw, or a defect. Preferably, the sensor has at least one linear segment and a linear array of sense elements for rapid imaging as the test material surface is scanned. In another embodiment of the invention, the sense elements can move independently of the primary winding and measurements are performed at multiple primary winding locations on the test material to provide a wealth of complementary information for the source reconstruction. In one embodiment of the invention, the sources are current loops that span three orthogonal directions. In another, the source is an equivalent dipole moment.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
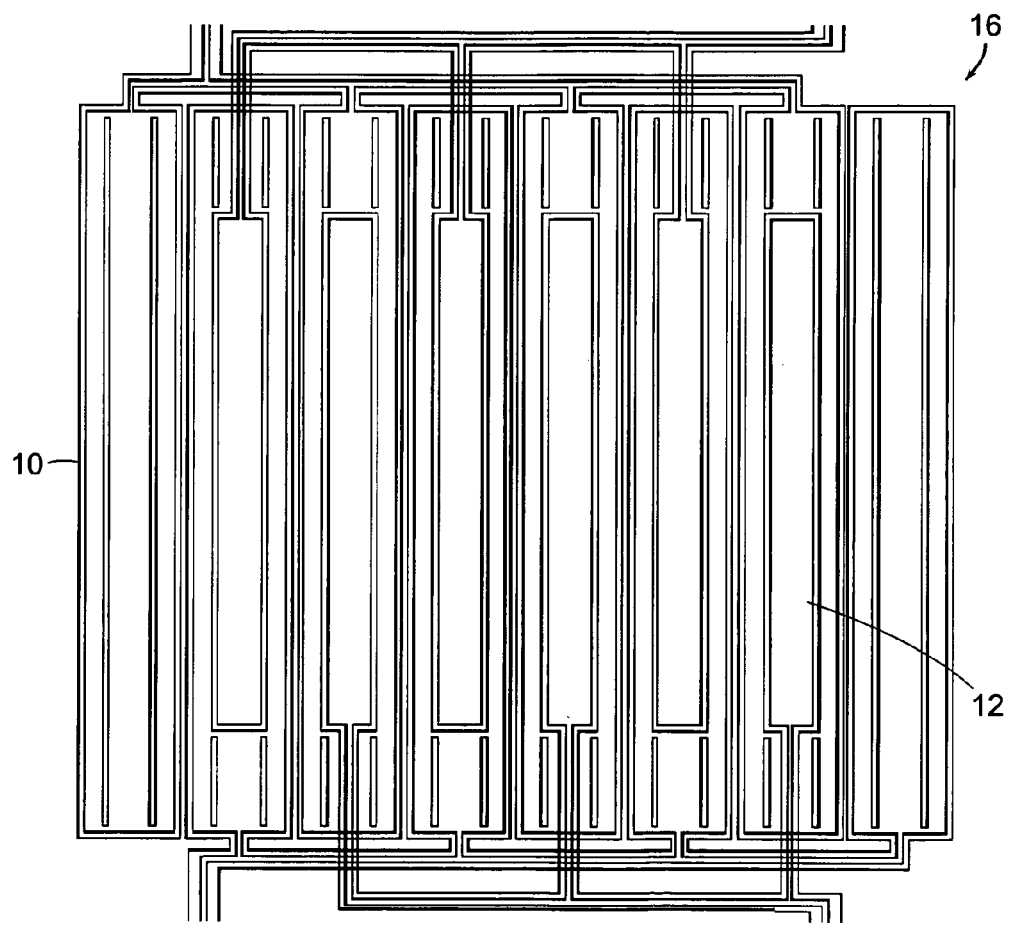
FIG. 1 is a drawing of a spatially periodic field eddy-current sensor.

A description of preferred embodiments of the invention follows. The use of sensors and sensor arrays is described for testing, inspection, and characterization of materials. This includes the detection and identification of subsurface objects, such as UXO, and for suppression of the responses from non-harmful clutter. Described are new methods and apparatus for calibration and imaging of materials and objects. Specifically, this includes sensing approach utilizing the magnetoquasistatic (MQS) response of a material and object through changes in the magnetic field caused by proximity to a conducting and/or magnetizable material. This sensing approach also applies to sensors that utilize the electroquasistatic (EQS) response of a material or object through changes in the electric field caused by proximity to a conducting and/or dielectric material. The sensors have capabilities for determining the properties, such as the electrical conductivity, dielectric permittivity, and magnetic permeability, of materials and depth, material type, size and orientation of hidden and subsurface objects. For UXO inspections, the principal surface considered is that interface between the air and ground, wherein the ground is a mixture of one or more of dirt, sand, rock, clay, moisture, and other such materials. A subsurface object is generally an object within 1 m (39 in.) of the surface and particularly within 0.5 m (20 in.).

Methods are described for actively and/or passively canceling all or part of a primary field from a magnetic or electric field drive winding or electrode for the purposes of enhancing sensitivity. This also includes methods for calibration an array of sensors. Furthermore this includes methods for correcting for distortion produced by winding or electrode edges. This also includes methods for measuring in two or more orientations to enhance the sensitivity of the measurements or at two or more lift-off heights. This was described in earlier U.S. Pat. No. 5,629,621 and related divisionals, U.S. Pat. Nos. 5,990, 677, 6,252,389, and 6,433,542, the entire teachings of which are incorporated herein by reference. For the use of multiple orientations the sensor might be rotated about its vertical axis above an object to collect continuous or incremental data at varied orientations about the vertical axis. Also the object might be tilted about a horizontal axis to assess effects of such tilting as well as to capture additional views of the object to improve observability of object features and properties. Multiple lift-off and multiple orientation measurements might also be made to further enhance observability.

In addition, as disclosed in earlier U.S. Pat. Nos. 5,629,621 and 6,144,206, the entire teachings of which are incorporated herein by reference, the sensor spatial wavelength may be maximized by using a sheet of current. In this case the return wires may be in a plane farther from the material under test as originally illustrated in FIG. 14 of U.S. Pat. No. 5,629,621. In this case the sheet of current carrying wires might be rotated relative to the object, scanned across the object or lifted-off the object in a controlled fashion to improve observability. Furthermore, the sensing elements might be scanned with the drive stationary or the drive scanned with the sensing element or elements stationary. Furthermore, a method for switching multiple drives as disclosed in U.S. patent application Ser. No. 10/045,650, the entire teachings of which are incorporated herein by reference. Alternatively, in some applications it might be more convenient to use two separate or two collocated drives that are run simultaneously instead of switched. These drives might be excited at different or the same input current frequencies to permit separation or combination of the responses to the buried object or material properties of interest. Also described herein is the use of sensors to produce images of internal material properties, surface topology, surface geometric features and object geometric features.

For the MQS sensors, the passage of current through a primary or drive winding creates magnetic field and multiple sense elements are used to measure the magnetic field. For conducting materials, such as metals and alloys, a time varying magnetic field induces eddy currents in the materials, which in turn creates a secondary magnetic field that can be detected. For magnetic but non-conducting materials, the magnetic permeability or susceptibility of the material alters the magnetic field distribution, which can also be detected. The ability to characterize materials using the complex permeability including layered materials was disclosed under U.S. Pat. No. 5,629,621. For buried objects there is a significant influence from conducting ground or ground that exhibits a relative magnetic permeability greater than 1.0. For these cases the use of grid methods or other model based methods with an array of sensors, to characterize the background (e.g., ground) and account for this when estimating features of objects or detecting such objects is also valuable. Rapid methods that use precomputed databases of sensor responses are also needed to provide near real-time images and feature estimates in the field to support decisions on digging and clearance of buried objects. Other uses of these methods include security applications for buried objects on humans, in packages (e.g., mail and package inspection) and in other situations where objects may be obscured making visual or other means impractical. An example sensor geometry, termed a Meandering Winding Magnetometer (MWM®) for nondestructive testing, is described in U.S. Pat. Nos. 5,015,951, 5,453,689, and 5,793,206, the entire teachings of which are incorporated herein by reference. The MWM is a "planar," sensor that was designed to support quantitative and autonomous data interpretation methods. These methods, called grid measurement methods, permit identification of object features, such as size and depth, and provide quantitative images of absolute electrical properties (electrical conductivity and magnetic permeability) of material properties. MWM sensors and MWM-Arrays are used in a variety of nondestructive testing applications, including fatigue monitoring and inspection of structural components for detection of flaws, degradation and microstructural variations as well as for characterization of coatings and process-induced surface layers.

Characteristics of these sensors and sensor arrays include directional multi-frequency magnetic permeability or electrical conductivity measurements over a wide range of frequencies, e.g., from 250 Hz to 40 MHz with the same MWM sensor or MWM-Array, high-resolution imaging of measured permeability or conductivity, rapid permeability or conductivity measurements with or without a contact with the surface, and a measurement capability on complex surfaces with a hand-held probe or with an automated scanner.

FIG. 1 illustrates the basic geometry of an the MWM sensor 16, a detailed description of which is given in U.S. Pat. Nos. 5,453,689, 5,793,206, 6,144,206 and 6,188,218 and U.S. patent application Ser. Nos. 09/666,879 and 09/666,524, both filed on Sep. 20, 2000, the entire teachings of which are incorporated herein by reference. The sensor includes a primary winding 10 having extended portions for creating the magnetic field and secondary windings 12 within the primary winding for sensing the response. The primary winding is fabricated in a spatially periodic pattern with the dimension of the spatial periodicity termed the spatial wavelength 1. A current is applied to the primary winding to create a magnetic field and the response of the material under test (MUT) to the magnetic field is determined through the voltage measured at the terminals of the secondary windings. This geometry creates a magnetic field distribution similar to that of a single meandering winding. A single element sensor has all of the sensing elements connected together. The magnetic vector potential produced by the current in the primary can be accurately modeled as a Fourier series summation of spatial sinusoids, with the dominant mode having the spatial wavelength 1. For an MWM-Array, the responses from individual or combinations of the secondary windings can be used to provide a plurality of sense signals for a single primary winding construct as described in U.S. Pat. No. 5,793,206 and Re. No. 36,986, the entire teachings of which are incorporated herein by reference.

Figure 2:
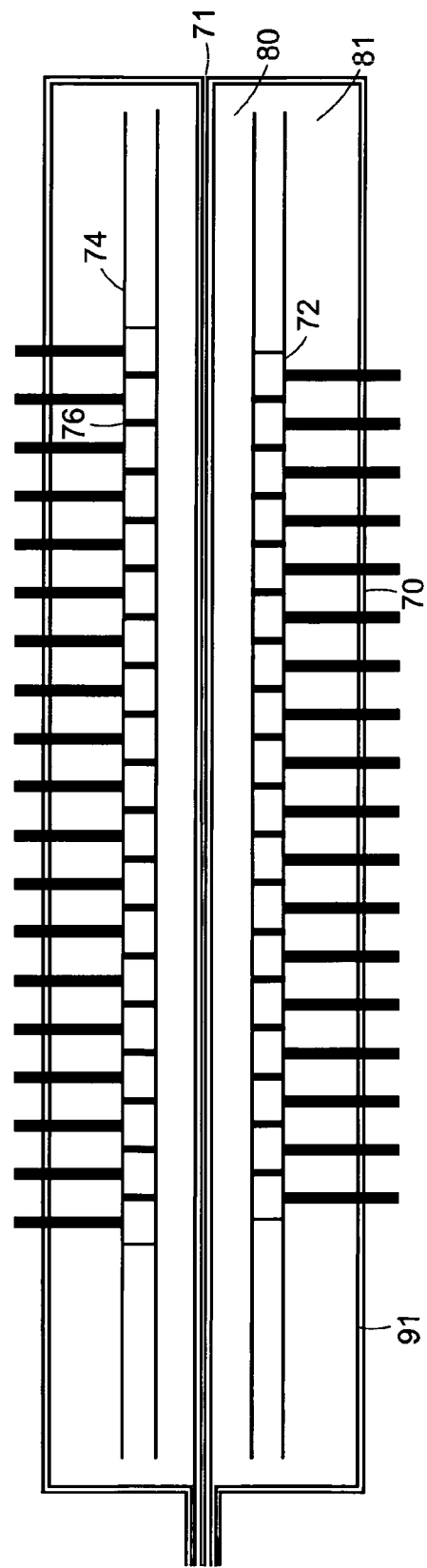
FIG. 2 is an expanded view of the drive and sense elements for an eddy-current array having offset rows of sensing elements.
Figure 3:
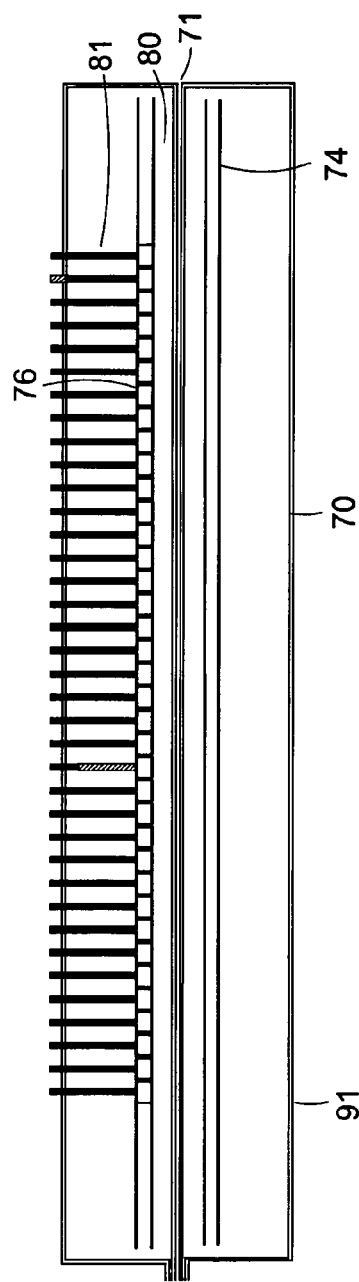
FIG. 3 is an expanded view of the drive and sense elements for an eddy-current array having a single row of sensing elements.
Figure 4:
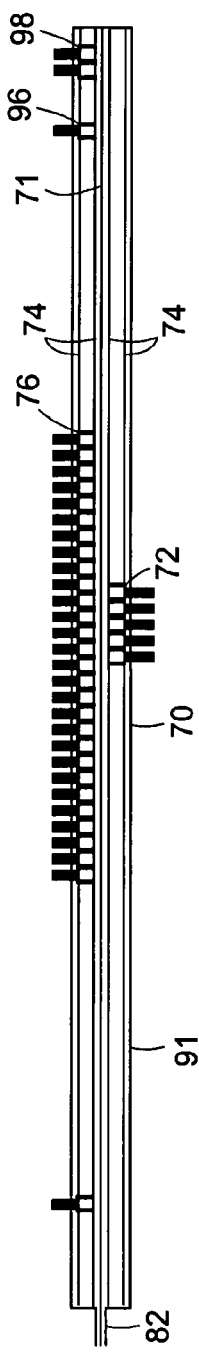
FIG. 4 is an expanded view of an eddy-current array where the locations of the sensing elements along the array are staggered.

Sensor arrays use multiple sensing elements to inspect the materials. Example sensor arrays are shown in FIG. 2 through FIG. 4 some embodiments of which are described in detail in U.S. patent application Ser. No. 10/102,620, filed Mar. 19, 2002, and Ser. No. 10/010,062, filed Mar. 13, 2001, the entire teachings of which are incorporated herein by reference. These arrays include a primary winding 70 having extended portions for creating the magnetic field and a plurality of secondary elements 76 within the primary winding for sensing the response to the MUT. The secondary elements are pulled back from the connecting portions of the primary winding to minimize end effect coupling of the magnetic field. Dummy elements 74 can be placed between the meanders of the primary to maintain the symmetry of the magnetic field, as described in U.S. Pat. No. 6,188,218. When the sensor is scanned or when a feature (or object) propagates across the sensor, perpendicular to the extended portions of the primary winding, secondary elements 72 in a primary winding loop adjacent to the first array of sense elements 76 provide a complementary measurement. Also, the sensor may be rotated or tilted relative to the object. These arrays of secondary elements 72 can be aligned with the first array of elements 76 so that images of the material properties will be duplicated by the second array (improving signal-to-noise through combining the responses or providing sensitivity on opposite sides of a feature such as an object as described in U.S. patent application Ser. Nos. 10/102,620 and 10/010,062, the entire teachings of which are incorporated herein by reference. Alternatively, to provide complete coverage when the sensor is scanned across a part the sensing elements, can be offset along the length of the primary loop perpendicular to the extended portions of the primary winding, as illustrated in FIG. 2.

The dimensions for the sensor array geometry and the placement of the sensing elements can be adjusted to improve sensitivity for a specific inspection. For example, the effective spatial wavelength or four times the distance 80 between the central conductors 71 and the sensing elements 72 can be altered to adjust the sensitivity of a measurement for a particular inspection. For the sensor array of FIG. 2, the distance 80 between the secondary elements 72 and the central conductors 71 is smaller than the distance 81 between the sensing elements 72 and the return conductor 91. An optimum response can be determined with models, empirically, or with some combination of the two. An example of a modified sensor design is shown FIG. 3. In this sensor array, all of the sensing elements 76 are on one side of the central drive windings 71. The size of the sensing elements and the gap distance 80 to the central drive windings 71 are the same as in the sensor array of FIG. 2. However, the distance 81 to the return of the drive winding has been increased, as has the drive winding width to accommodate the additional elements in the single row of elements. Increasing the distance to the return reduces the size of the response when the return crosses a feature of interest such as a crack. Another example of a modified design is shown in FIG. 4. Here, most of the sensing elements 76 are located in a single row to provide the basic image of the material properties. A small number of sensing elements 72 are offset from this row to create a higher image resolution in a specific location. Other sensing elements are distant from the main grouping of sensing elements at the center of the drive windings to measure relatively distant material properties, such as the base material properties for plates at a lap joint or a weld.

Figure 5:
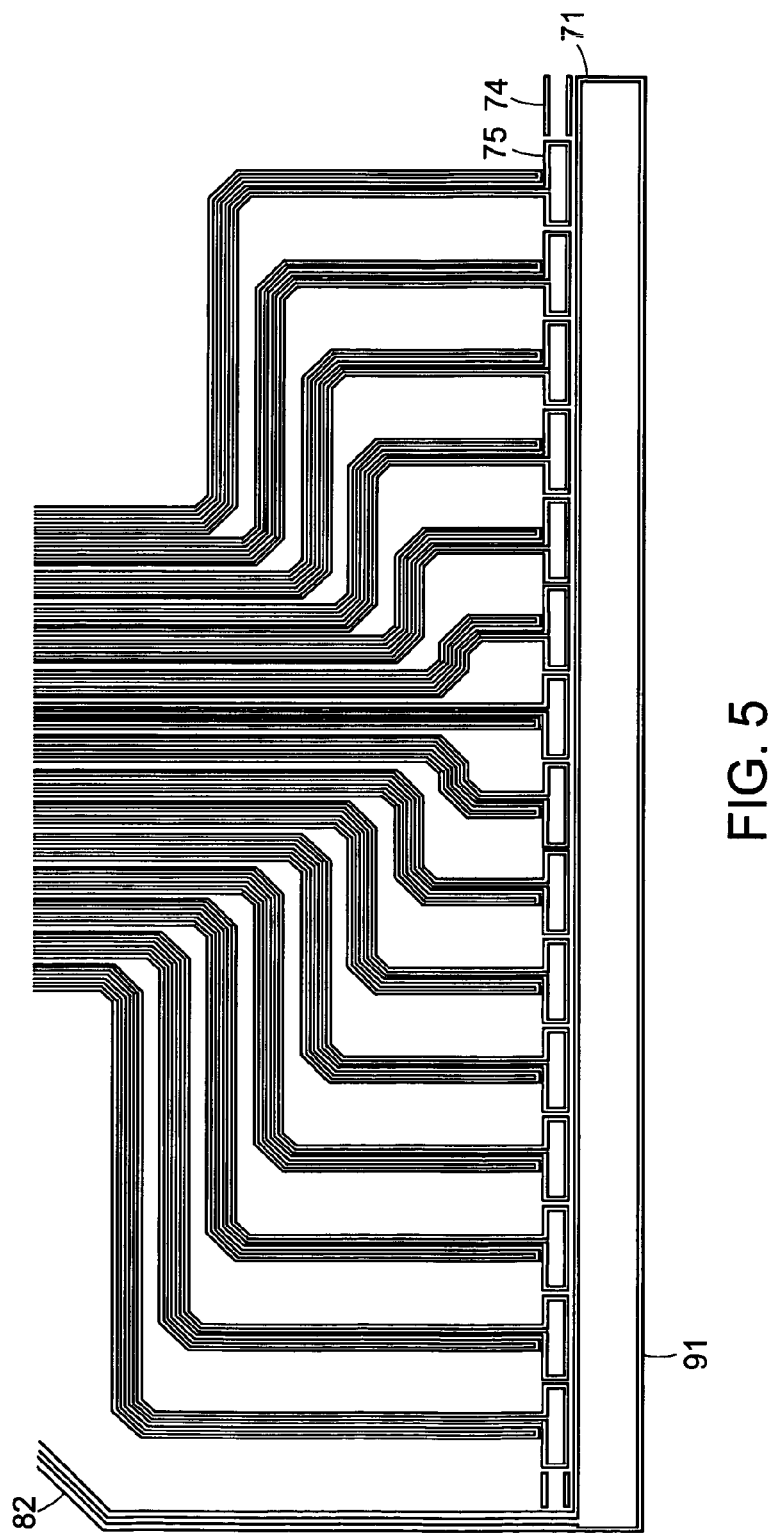
FIG. 5 is an expanded view of an eddy current array with a single rectangular loop drive winding and a linear row of sense elements on the outside of the extended portion of the loop.

In one embodiment of the invention, the number of conductors used in the primary winding can be reduced further so that a single rectangular drive is used. As shown in FIG. 5, a single loop having extended portions is used for the primary winding. A row of sensing elements 75 is placed on the outside of one of the extended portions. This is similar to designs described in U.S. Pat. No. 5,453,689 where the effective wavelength of the dominant spatial field mode is related to the spacing between the drive winding and sensing elements. This spacing can be varied to change the depth of sensitivity to properties and defects. In one embodiment of the invention this distance is optimized using models to maximize sensitivity to a feature of interest such as a buried crack or stress at a specific depth. Advantages of the design in FIG. 5 include a narrow drive and sense structure that allows measurements close to material edges and non-crossing conductor pathways so that a single layer design can be used with all of the conductors in the sensing region in the same plane. In another embodiment of the invention additional rows of sense elements can be placed on the opposite side of the drive 71 at the same or different distances from the drive. In another embodiment of the invention sensing elements can be placed in different layers to provide multiple lift-offs at the same or different positions.

Figure 6:
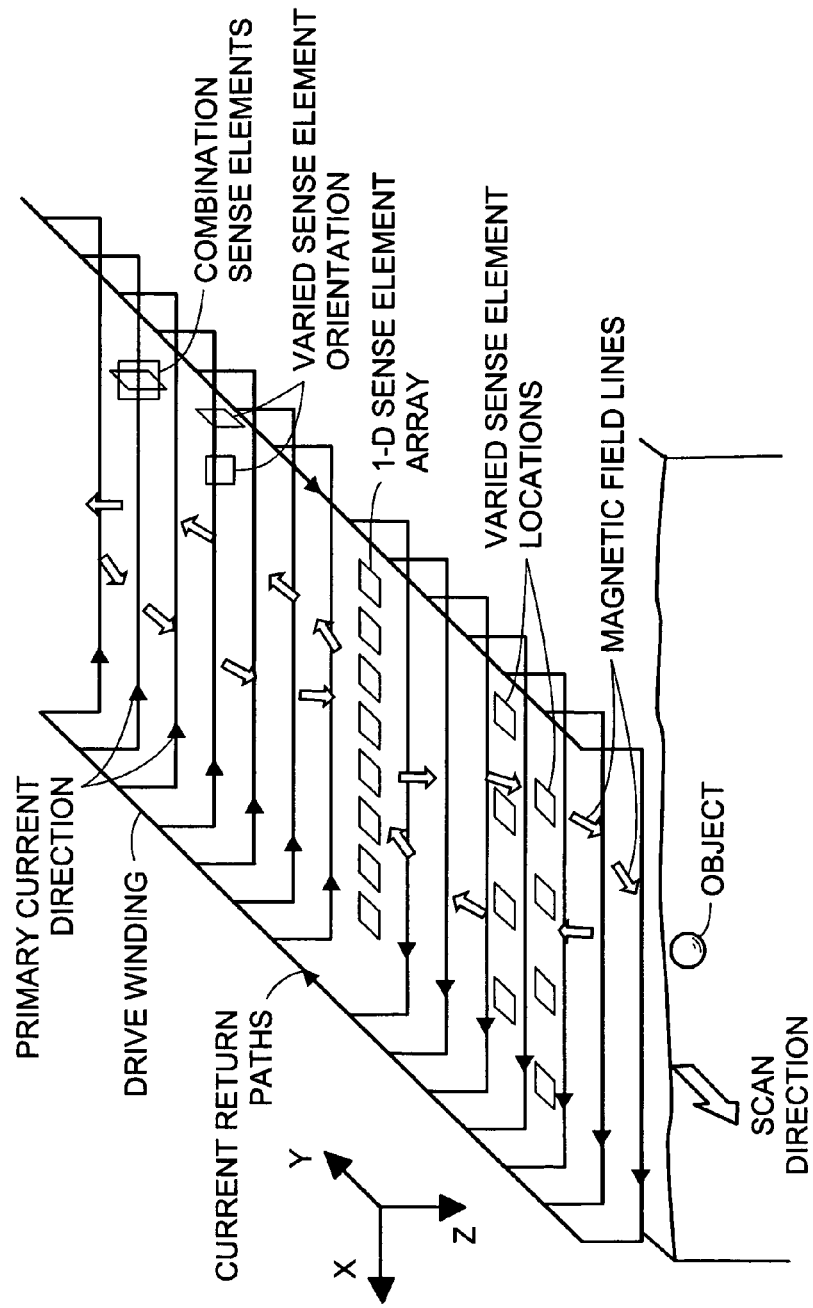
FIG. 6 is a drawing of a sensor array having a distributed drive winding and multiple sense elements.

In another format, the magnetic field distribution is "shaped" or imposed in a preferred pattern. This is accomplished by adjusting the net current flow through each conducting segment of the primary winding, distributing the current carrying conductors across the footprint of the sensor array, having different numbers of conductor segments. This is accomplished by altering the number of wires within each drive segment, or through some combination of the above. An array of sensing elements is then used to sense the presence and properties of buried objects within the shaped field, as illustrated in FIG. 6. This was described in U.S. Pat. No. 6,144,206. At different locations within the shaped field, the object is excited by various magnetic field orientations. Also, sensing elements are located both above the object and at different locations within the shaped field. The vertical and horizontal components of the magnetic field are shaped so that scanning the drive over buried objects leads to a continuous variation in the orientation of the field imposed on the objects. These multiple field orientations provide complementary and somewhat independent information about the object properties and can aid in object classification. Additional information about the object properties is also gained by locating the sensing elements at various positions throughout the drive winding and with different orientations (e.g., horizontal and vertical). In particular, since the sensing element positions are registered with respect to each other (e.g., in a linear array), scanning of the array (in the direction perpendicular to the sensing element distribution) can provide a two-dimensional image of the responses to a buried object. Also, either differential (e.g., figure eight) or absolute (e.g., square) coils can be used. When multiple linear arrays are used at different locations within the drive's "shaped" field, then independent information is obtained from each array. This information might then be combined to construct three-dimensional images of buried objects by estimating geometric features, such as aspect ratio, using simplified object representations such as ellipsoids, or by estimating the effective dipole moments associated with the object.

A distributed drive winding format has an advantage over single current loop drives in that the magnetic field energy can be focused for deeper penetration depths. However, a simple dual rectangle alternative (or an intermediate design concept) may be less costly and provide a smaller sensor footprint needed for some portable field applications. It is possible to excite a spatial mode of the same fundamental wavelength by using a single current loop of similar dimensions instead of having several windings following a sinusoidal envelope function. Such an implementation is much simpler to fabricate than a distributed current drive. However, the energy spectrum of the distributed drive current configuration has more energy concentrated in the deeper penetration depth field modes. For the case of the sinusoidal drive current distribution, the magnitude of the transform falls off quickly for wavenumbers greater than the dominant mode, while the spectrum of the single loop shows substantial energy at wavenumbers much greater than the fundamental. In practice this means that a distributed drive winding has more of the magnetic field energy concentrated in the spatial modes that penetrate furthest into the material, which provides increased sensitivity to the object and material properties further away from the surface. In one embodiment of the invention a spatially distributed drive winding (e.g., with a sinusoidal distribution) is combined with a rectangular drive, a sheet of current, or any combination of these. In one embodiment of the invention the sinusoidal drive is scanned to provide vertical and horizontal field orientations that vary as it moves over the object and a second sheet of nominally uniform current, as disclosed in FIG. 8B of U.S. Pat. No. 6,144,206, is used with the linear conductors oriented perpendicular to the conductors of the distributed drive in the same or offset horizontal plane. In another embodiment of the invention multiple drives are used at different lift-offs either in the same or different orientations, with the same or different dominant spatial wavelengths. A preferred embodiment of the invention is to have the longer wavelength farther from the ground/object.

Figure 7:
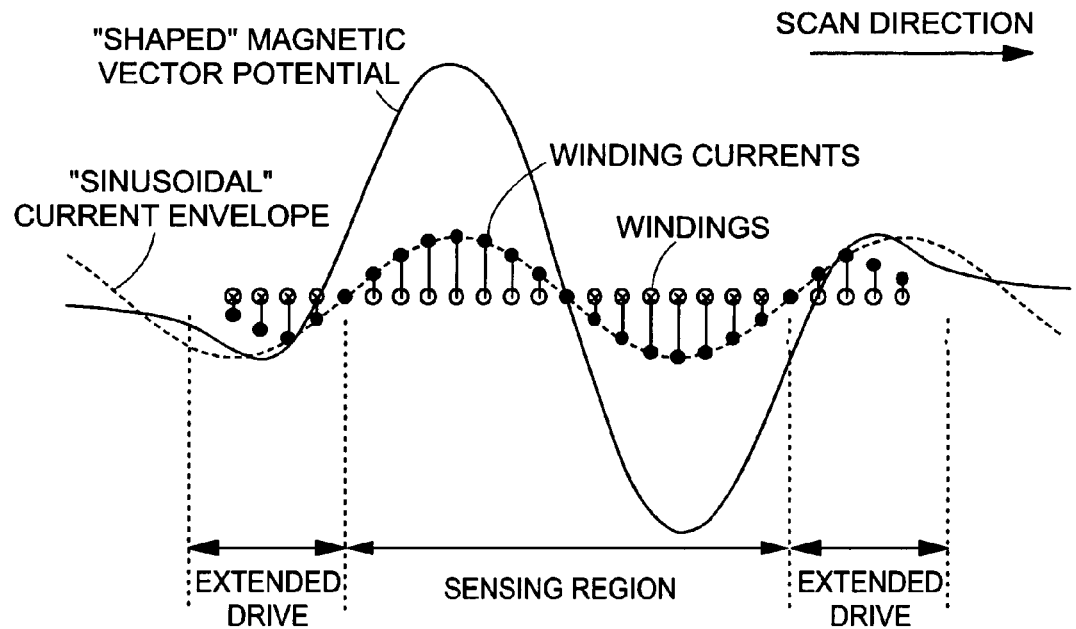
FIG. 7 shows a current distribution envelope for a rectangular Cartesian sensor.

A preferred embodiment of the invention for practically controlling the magnetic field shape uses a single continuous winding conductor. By changing the number of winding turns in each spatial winding segment, the applied magnetic vector potential is "shaped". One desirable shape is a simple sinusoid as illustrated in FIG. 7. The use of a single continuous wire to form the drive winding provides the desired current profile for the drive without having to drive each current segment independently. This "sinusoidal" drive was used for example for the array of FIG. 6. In this array, the drive current profile approximates a single period of a sinusoidal envelope so that the length of the drive winding and the spatial wavelength 1 are approximately 32 inches. This spatial wavelength is independent of the excitation frequency since the sensor dimensions are much smaller than the wavelength of traveling waves at the operating frequency. The depth of sensitivity to large buried objects is related to the size and geometry of the drive winding and is typically a fraction of this wavelength. The main segments of the first prototype drive winding are approximately 24 inches wide and the return legs are approximately three inches behind the plane of the main segments.

This helps to reduce fringing field effects so that sensing elements placed across the array width are exposed to the same magnetic field. This facilitates imaging of buried objects (when scanning over the ground) using the response of sensing elements placed within the footprint of the drive winding. Adding extended drive regions (as illustrated in FIG. 7. helps reduce undesired fringing field effects, as described below.

The sensor arrays can be operated in continuous or pulsed mode. Early analysis of both continuous and pulsed mode approaches. For continuous mode operation, the measured response is the magnitude and phase (or real and imaginary parts) of the voltage on the sensing elements relative to the drive current at multiple frequencies and/or multiple heights above the ground. The frequency range for the sensor array depends upon the self-resonance frequencies of both the drive and sense windings and the drive capability and bandwidth of the impedance instrumentation.

The shaped field drive winding and sensing array structure forms a scalable and reconfigurable platform for the development, testing, and deployment of a variety of drive and sense configurations. For example, the design of FIG. 6 has the capability for electrical or mechanical self-nulling of the sensing elements. When the sensing coils are oriented vertically and mechanically centered across the primary winding, there is no net field passing through the coil so that the measured response is only due to the object being detected. This also occurs with horizontally oriented coils when placed near the quarter wavelength locations of the primary winding, since the imposed field is essentially horizontal near those locations. Alternatively, for multiple secondary elements placed along the width of the primary, the differential signal between sensing elements can be measured. When the differential measurements are combined with a single absolute measurement of the secondary element responses, the absolute signal levels for the entire array can be reconstructed. This electrical measurement of the absolute and differential responses has the capability of electrically adjusting the gains for each sensing element, which can improve the stability against mechanical variations in the coil positions.

Alternative sensing elements that respond directly to the magnetic field intensity instead of the time rate of change of the field intensity, such as magnetoresistive sensors, giant magnetoresistive (GMR) sensors, Hall effect sensors, or SQUIDS, could also be used to extend the low frequency measurement capability. In particular, the use of GMR sensors for characterization of materials is described in more detail in U.S. patent application Ser. No. 10/045,650 filed Nov. 8, 2001, the entire contents of which are hereby incorporated by reference. Such sensors may also provide magnetic field measurements in two or three directions.

Figure 8:
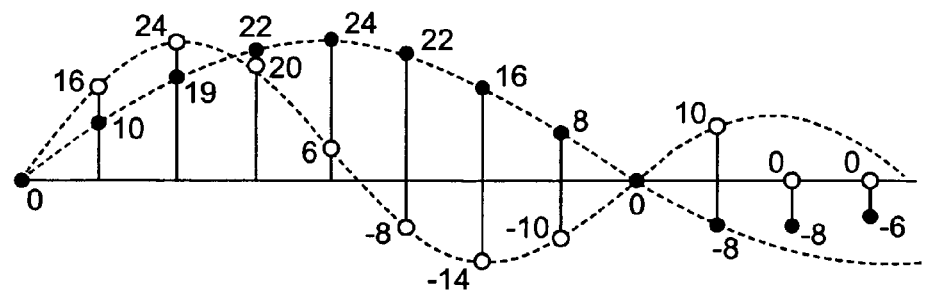
FIG. 8 shows a current distribution envelope for a cylindrical sensor having two spatial wavelengths. The current distribution follows a Bessel function envelope.

Since the depth of sensitivity of the sensor depends on the imposed spatial wavelength (e.g., the shape of the applied magnetic field distribution for the sinusoidal shaped field drive designs), the use of more than one excitation wavelength will provide some information on how object or material properties change with depth. Multiple spatial wavelength interrogations can be performed with multiple sensing structures by carefully registering the different sensors at the same location, as described for example in U.S. Pat. Nos. 5,015,951 and 6,144,206. However, the fundamental wavelength of the current excitation can also be altered by changing the current distribution in the primary winding segments. Furthermore, the use of more than one wavelength within the same footprint has the advantage that the lift-off (distance between sensor and UXO or ground surface) will be the same for both modes of operation. This is very useful when there are more than two unknown parameters and measurements under two different applied magnetic field distributions are necessary to determine all unknowns uniquely. This may be accomplished by supplying an independent current drive for each segment and changing the relative magnitudes of these drives to follow an appropriate envelope function with the needed wavelength. A more practical approach avoids the need for multiple drives by using two or more independent winding circuits and switching the relative current direction between them. Example winding distributions are given in Table 1 for a rectangular (cartesian) magnetometer and Table 2 for a circular magnetometer. Two windings, A and B, and the number of turns each has in every current segment, are shown in this table. Negative turns indicate that they are wound in the opposite direction. When the two windings are driven in the same polarity, the resulting current distribution excites a mode with a fundamental wavelength equal to the length of the sensor. If, on the other hand, the two windings are driven with opposite polarities, the resulting excitation has a fundamental wavelength equal to one-half of the sensor length. This distribution for a circular sensor is illustrated in FIG. 8, where the filled circles correspond to the A+B connection and the hollow circles correspond to the A−B connection. The curves show the envelope functions, which is a Bessel function for the circular sensor. The number of turns do not fall exactly on the curves because they need to be integers. The number of turns in the last two windings are tapered off in order to avoid rapid changes in the primary current distribution and to reduce higher order spatial modes in the field.

TABLE 1

Two-wavelength winding pattern for a rectangular magnetometer.
Nominal Turns per Segment

| | Nominal Turns per Segment | | | | | | | | | | | | | | | |
|---|---|---|---|---|---|---|---|---|---|---|---|---|---|---|---|---|
| A | 0 | 14 | 22 | 21 | 13 | 3 | −4 | −4 | 0 | 4 | 4 | −3 | −13 | −21 | −22 | −14 | 0 |
| B | 0 | −4 | −4 | 3 | 13 | 21 | 22 | 14 | 0 | −14 | −22 | −21 | −13 | −3 | 4 | 4 | 0 |
| A + B | 0 | 10 | 18 | 24 | 26 | 24 | 18 | 10 | 0 | −10 | −22 | −24 | −26 | −24 | −18 | −10 | 0 |
| A − B | 0 | 18 | 26 | 18 | 0 | −18 | −26 | −18 | 0 | 18 | 26 | 18 | 0 | −18 | −26 | −18 | 0 |

TABLE 2

Two-wavelength winding pattern for a circularly symmetric magnetometer.
Nominal Turns per Segment

| | Nominal Turns per Segment | | | | | | | | | |
|---|---|---|---|---|---|---|---|---|---|---|
| A | 13 | 21 | 21 | 15 | 7 | 1 | −1 | 0 | 1 | −4 | −3 |
| B | −3 | −3 | 1 | 9 | 15 | 15 | 9 | 0 | −9 | −4 | −3 |
| A + B | 10 | 18 | 22 | 24 | 22 | 16 | 8 | 0 | −8 | −8 | −6 |

TABLE 2-continued

Two-wavelength winding pattern for a
circularly symmetric magnetometer.
Nominal Turns per Segment Nominal Turns per Segment

| A – B | 16 | 24 | 20 | 6 | –8 | –14 | –10 | 0 | 10 | 0 | 0 |
|---|---|---|---|---|---|---|---|---|---|---|---|

Another consideration for the drive winding current distribution is the elimination of the dipole moment to improve the robustness of the sensor response and reduce potential calibration variations, which is described in more detail in U.S. patent application Ser. No. 10/045,650. Near the sensor surface the magnetic field decays essentially exponentially, at a rate determined by its spatial wavelength and the skin depth in the medium. However, far from the sensor the fields fall off at a rate determined by the lowest order multipole moment excited by the sensor. Ideally, this will be a high order moment, since it is desirable for the sensor to lose sensitivity quickly with distance beyond the near surface region of interest. Otherwise the sensor response will be affected by the presence of magnetizable and/or conducting objects in its vicinity, even if they are much farther than the buried ordnance. Whereas this effect may be small, it can change with time, as objects near the sensor are moved or when the sensor is moved to inspect a new location. Thus, it cannot be eliminated via calibration and will result in a lack of reproducibility.

For magnetic fields, the lowest order multipole solution possible to Laplace's equation in spherical coordinates is the dipole, whose scalar magnetic potential decays as $r^{-2}$. If the dipole moment is eliminated, the next dominant mode is the "octupole," whose scalar magnetic potential decays as $r^{-4}$. In practice it is sufficient to cancel the dipole moment to eliminate unwanted long range sensitivity. This can be accomplished by making the moment contributions of each individual winding segment sum to zero and including a fraction of a wavelength past the end of the single period where the current is in the opposite direction. Since the number of winding turns is always an integer, it is impossible to satisfy the-zero-sum constraint exactly while at the same time strictly following the sinusoidal envelope function. Instead, the number of extended turns are chosen to cancel the dipole moment and to taper off towards the ends of the sensor in order to avoid rapid changes in the primary current distribution, which would result in more energy in higher order spatial and a reduction of the sensitivity at greater depths. An example winding distribution is illustrated in FIG. 7 for a rectangular (cartesian) drive, where the current distribution follows a sinusoidal envelope in the central, sensing. A similar winding distribution is shown in FIG. 8 for a circular cylindrical drive winding, where the current distribution in the central region follows a Bessel function envelope.

Figure 9:
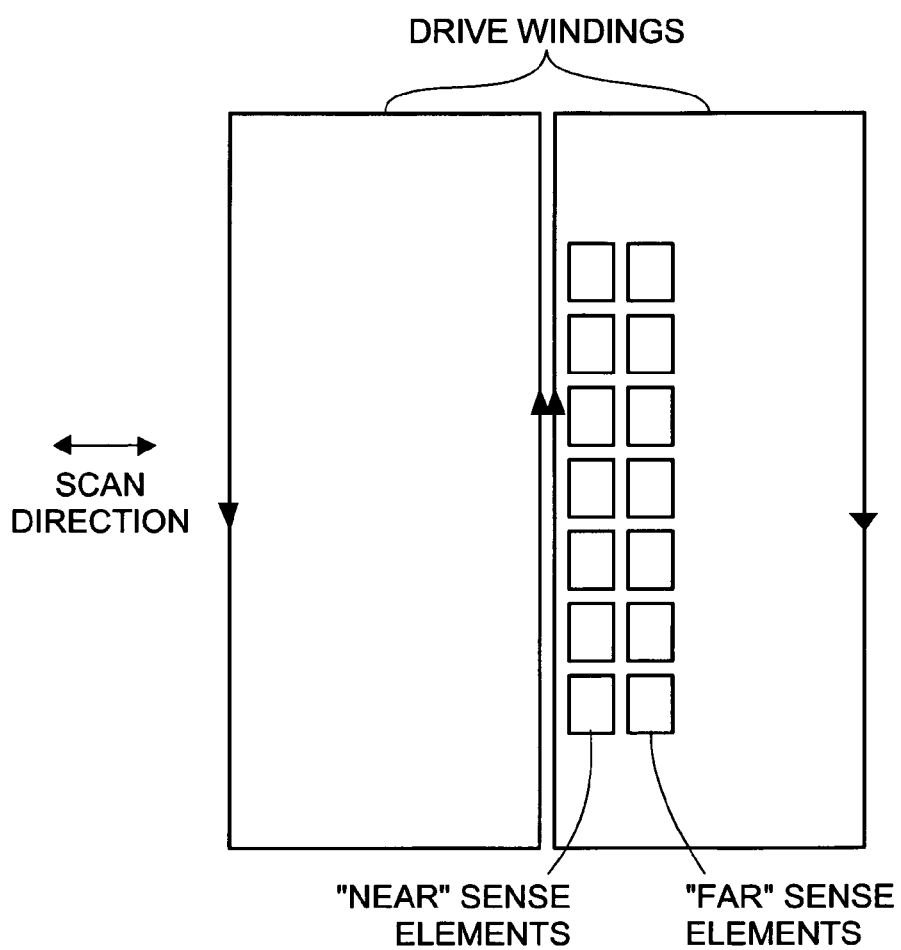
FIG. 9 is a drawing of a segmented field inductive sensor.

An alternative embodiment of the invention for a sensor array is shown in FIG. 9. In this case, the drive winding has a two rectangle design but two linear array of sense elements are on the same side of the center portion of the drive winding. The return segments for the drive winding are far enough from the sensing elements so that the sensed response is dominated by the magnetic field around the center drive segments. The sensing elements nearest these center drive segments are more sensitive to shorter spatial wavelength modes of the imposed magnetic field and the sensing elements farther from the center segments are more sensitive to longer wavelength or deeper spatial modes. This sensor configuration can be described as a segmented field sensor since the sensing elements respond to segments of the magnetic field that have different spatial wavelengths or penetration depths. A single rectangular drive could also be used to make a smaller sensor, but the two rectangles provide greater symmetry and higher field intensities in the central region. As another embodiment of the invention, the design of FIG. 10 has a more complicated drive winding geometry, with multiple rectangular coils used to shape the field distributions. Sensing elements placed at various locations throughout the array will respond to different field orientations and provide complementary information about the objects. In both cases, the orientations of the sense elements can be adjusted to select a desired orientation of maximum sensitivity to property variations. Both of these designs have the drive and sense elements mounted onto a common support substrate so that they move together when scanned over a part. This common substrate simplifies the instrumentation and position registration of the array, but has limited spatial sampling of the field around the drive winding.

When the sense elements are not located in a "null" region for the magnetic field, there tends to be a strong direct coupling between the drive winding and sense element response. This is the result of a large local magnetic field created by the drive winding. This local field can be much larger than the field from the currents induced in the detected object, which can reduce the achievable signal-to-noise ratio in the measurement. While mechanical nulling by placing the sense elements in the null field regions is possible, an alternative is to perform electrical nulling by adding an additional drive winding element or bucking coil that effectively cancels the magnetic field in the vicinity of the sense elements. In this manner, the local magnetic field in the vicinity of the sense elements can be made small without appreciably changing the deeper magnetic field distribution in the vicinity of any hidden objects. This then allows greater amplification of the measured signals without saturation of the measurement instrumentation.

Electrical cancellation of the drive field can be performed with passive bucking coils and actively driven coils. In each case the sense elements can be absolute coils, differential coils, GMR sensors, combinations of absolute and differential coils, or combinations of coils with GMR sensors. The specific example described in the following are focused on magnetic fields but similar designed apply to electric field arrays.

Passive bucking coils are typically coils connected in series with the primary winding. They reduce or null the magnetic fields in the vicinity of secondary sensing elements in the absence of the MUT, with minimal or selective reduction of the primary field in the regular location of the MUT. This reduction of the field in the vicinity of the secondary sensing elements is designed to enhance signal-to-noise by reducing the component of the measurement signal not dependent on MUT properties of interest and allowing larger signal gains to be applied. The bucking coil can alternatively be used to extend the dynamic range of the sensor by removing the component of the signal not dependent on properties of interest. Selective reduction of the primary field by the bucking coil (similar to magnetic field shaping) can be utilized to balance the response of the sensor to the MUT and further increase the dynamic range the sensor. The reduction or nulling of the field can be adjusted by mechanical positioning of the coil and/or by using passive electrical components (i.e., resistors) to selectively shunt current past the bucking coil. Also, the fields produced by bucking coil can be modeled and included in the total field exciting the material.

Active bucking coils are typically driven by an independent current source for which the magnitude and phase (or the real and imaginary parts or the in-phase and quadrature phase components) can be controlled independent of the primary current. One implementations of this approach is to use Direct Digital Synthesis to synthesize the waveform for excitation of the bucking coil such that the phase is locked relative to the primary coil excitation current. Also, independent measurement of the bucking coil and primary coil excitation can be used to account for the effects of the bucking coil on the total MUT excitation. This allows the use of model-based methods for converting the measurement response into the material or geometric properties of interest, at the expense of an additional drive current measurement. These active bucking coils can also be used in an adaptive fashion by using a background measurement over unflawed areas or areas without objects to select the bucking coil input current magnitude and phase in a feedback configuration designed to maintain the average field sensed by the array within a predetermined dynamic range. Also upon sensing an object or variation in properties the input current or other bucking coil parameters can be adjusted. For example, the bucking coil position relative to the sense elements can be altered. In one embodiment of the invention the bucking coil position is adjusted using active motion control (for example using piezoelectric actuation) to tune the output response from the sensing element array. Preferably, the response of the sense elements to the bucking coil field can be modeled so that the effects of driving the bucking coil on the measurement response are understood and quantifiable.

The use of bucking coils can affect the method of calibrating the sensor or sensor array, particularly if the response is effectively nulled when a flaw, object, or defect is not present. The effect is less severe when only a partial null is obtained, since a non-zero response is obtained even when the feature of interest is not present. Without a flaw, object, or defect present, if the response has been nulled, either through the use of a bucking coil or if the sensing element measures the differential response, then the scaling of the absolute response cannot be determined from a basic measurement.

In one such embodiment of the invention, described in U.S. patent application Ser. No. 10/045,650 an active coil is used around a GMR sensor to maintain the GMR sensor output at a predetermined level. Alternatively this may be an actively controlled coil that limits the range of variability of the GMR response in a predetermined fashion. This same approach might be used for inductive sensing coils where a second coil is used around one or more sensing elements to buck out the field entirely or partially. The goal of the feedback loop or controller may be to maintain the voltage response of the sensing element at a level determined to be acceptable or optimal based on local background scanning responses for the ground. In one such embodiment of the invention the ground conductivity and/or permeability and proximity to the ground is estimated using a model (e.g. with grid methods) and then the bucking coil current is adjusted to provide the best response for the continued scanning, or for repeated scans over the object. In another embodiment of the invention an operator interactively adjusts the bucking coil control loop goal so based on qualitative and quantitative information from the background, and sensor noise responses. In another embodiment of the invention the applied field is only partially removed by the bucking coil to maintain the absolute imaging capability to correct for background and measure proximity to the ground for conducting or magnetic soils.

Figure 11:
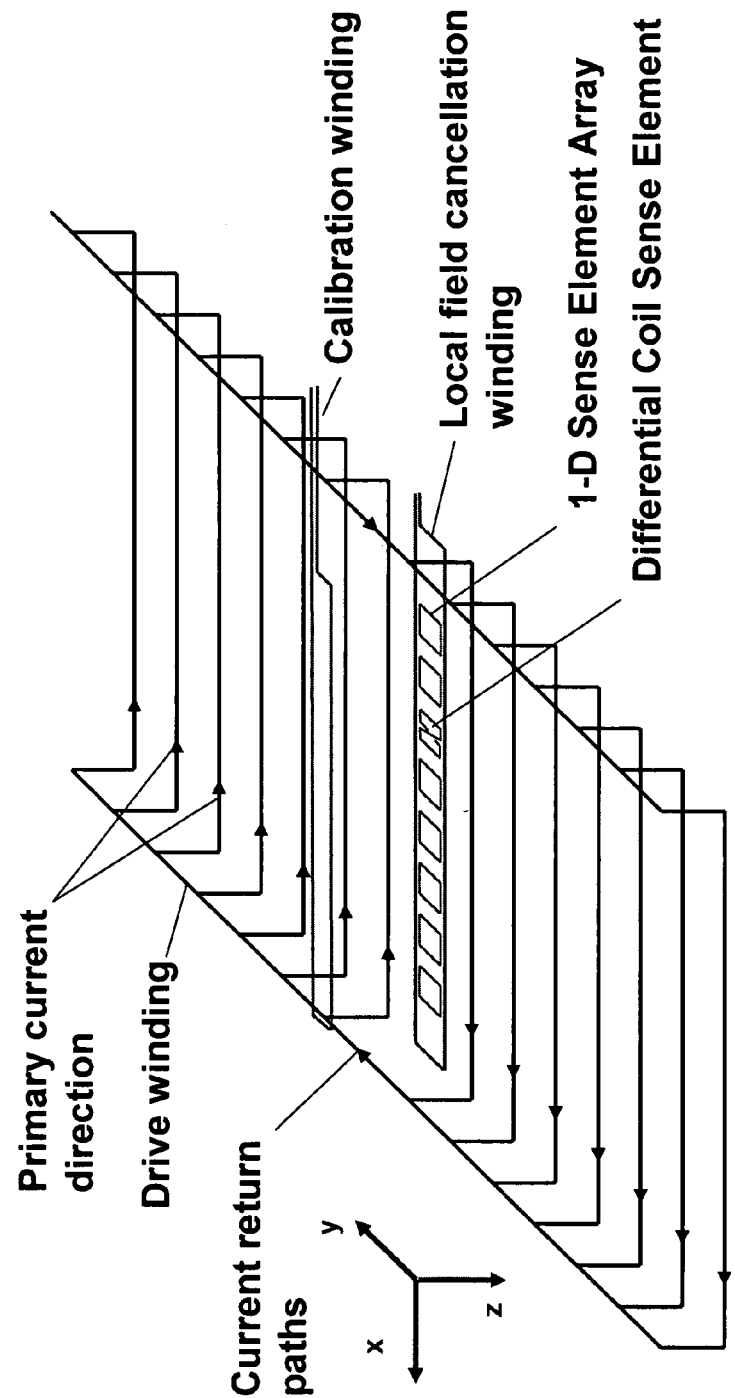
FIG. 11 is a drawing of a sensor array with a linear array of sense elements, a bucking coil, and a calibration coil.

Calibration can be performed by adding at least one other coil (termed the calibration coil) to the drive structure where the response (for example, the transimpedance) between the calibration coil or coils and each sense element is either known or can be calculated. An example additional rectangular coil is illustrated in FIG. 11. The calibration coil or coils only need to be energized during the calibration procedure and should not significantly influence the measurements being performed over the MUT. Preferably the calibration coil is a rectangular coil located behind the sense element array. In one embodiment of the invention, the sensor array is calibrated by performing two measurements. One measurement is performed with a calibration coil excited but the primary winding and bucking coil are not energized. Another measurement is then performed with the standard primary winding excited but the bucking coil and calibration coil are not energized, with the sensor over an unflawed portion of the material or a section of ground that does not contain any objects. Based on these two measurements, an offset and scale factor is then determined for each element of the array. During the second measurement the drive signal to the primary winding is attenuated to prevent saturation of the instrumentation. Additional measurements can be performed with other calibration coil positions or even multiple calibration coils so that a minimization can be performed in determining the best fit scale and offset factors. Thus, in this model referenced adaptive calibration, the calibration parameters are estimated using a model whose form (e.g., order), including nonlinear relationships may be derived empirically, and parameters may be estimated from other measurements or past measurements for recalibration, or by moving a separate coil that measures or applies a separate field to the array.

In another embodiment of the invention such calibration methods are used for nondestructive detection of cracks or material property measurement using MWM-Arrays. This might also include use of bucking coils with active or passive methods as described above, but for detection of anomalies and characterization of materials. For example, cracks in metals, composite fiber density and flaws, rebar in concrete, buried inclusions in titanium castings, weld geometry and properties, residual and applied stresses, and geometric feature imaging.

An efficient method for converting the response of the MWM sensor into material or geometric properties is to use grid measurement methods. These methods, described in U.S. Pat. No. 5,629,621, map the sensor impedance into the properties to be determined and provide for a real-time measurement capability. The measurement grids are two-dimensional databases that can be visualized as "grids" that relate two measured parameters to two unknowns, such as the magnetic permeability (or electrical conductivity) and lift-off (where lift-off is defined as the proximity of the MUT to the plane of the MWM windings). For the characterization of coatings or surface layer properties, three- (or more)-dimensional versions of the measurement grids called lattices and hypercubes, respectively, can be used. Alternatively, the surface layer parameters can be determined from numerical algorithms that minimize the least-squares error between the measurements and the predicted responses from the sensor, or by intelligent interpolation search methods within the grids, lattices or hypercubes.

An advantage of the measurement grid method is that it allows for real-time measurements of the absolute electrical properties of the material and geometric parameters of interest. The database of the sensor responses can be generated prior to the data acquisition on the part itself, so that only table lookup and interpolation operations, which are relatively fast, needs to be performed. Furthermore, grids can be generated for the individual elements in an array so that each individual element can be lift-off compensated to provide absolute property measurements, such as the electrical conductivity.

Figure 12:
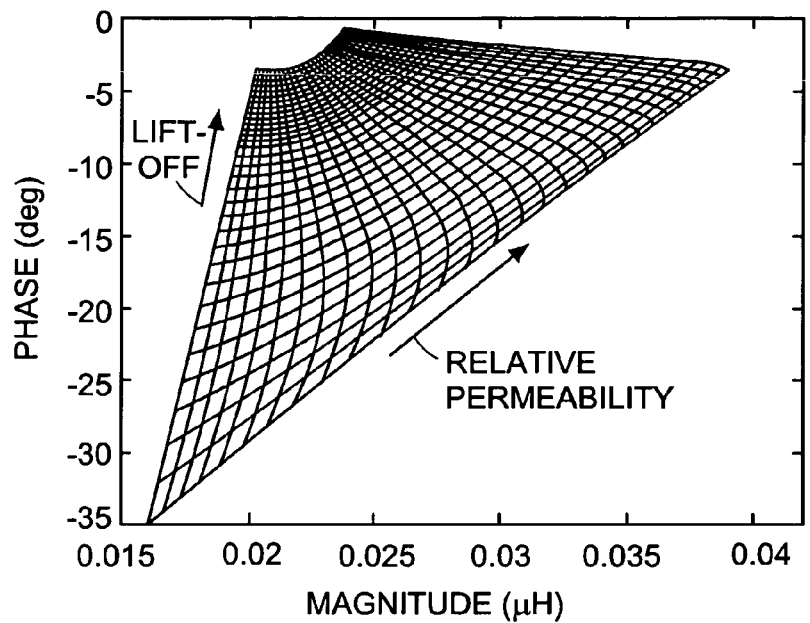
FIG. 12 shows a representative measurement grid relating the magnitude and phase of the sensor terminal impedance to the lift-off and magnetic permeability.
Figure 13:
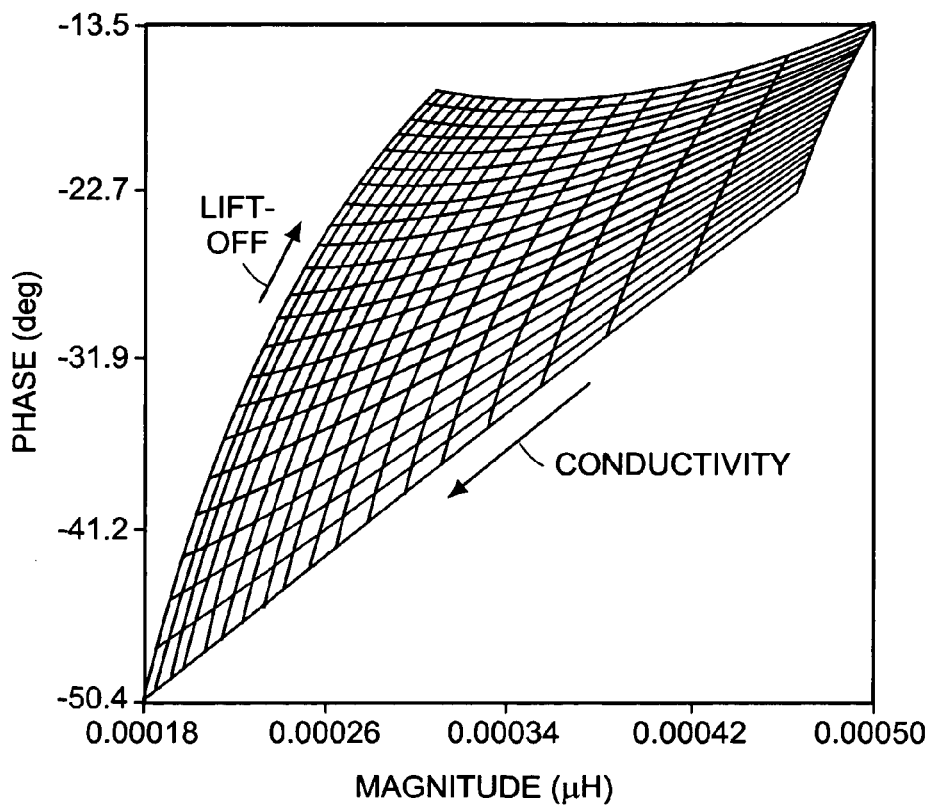
FIG. 13 shows a representative measurement grid relating the magnitude and phase of the sensor terminal impedance to the lift-off and electrical conductivity.

For ferromagnetic materials, such as most steels, a measurement grid provides conversion of raw data to magnetic permeability and lift-off. A representative measurement grid for ferromagnetic materials (e.g., carbon and alloy steels) is illustrated in FIG. 12. A representative measurement grid for a low-conductivity nonmagnetic alloy (e.g., titanium alloys, some superalloys, and austenitic stainless steels) is illustrated in FIG. 13. For coated materials, such as cadmium and cadmium alloys on steels, the properties of the coatings can be incorporated into the model response for the sensor so that the measurement grid accurately reflects, for example, the permeability variations of substrate material with stress and the lift-off. Lattices and hypercubes can be used to include variations in coating properties (thickness, conductivity, permeability), over the imaging region of interest.

Once an object is detected, it needs to be identified to determine if it is an unexploded ordnance or harmless clutter. A method for doing this is to apply filters to the measurement data that aid in the classification and discrimination of detected objects. One such filter is a measurement grid method. For example, for a hidden object the two unknown parameters of interest could be the diameter and depth of a spherically shaped buried metal object. These grids are then used to provide real time conversion of the measurement data into properties of interest such as size, depth, case thickness, and/or material properties (e.g., electrical conductivity or magnetic permeability). This is accomplished for each sensing element in the sensing element array. Thus, information from the resulting image must then be combined to reconstruct the object shape, depth, and orientation. This can also be combined with root searching methods to determine four or more unknown object features (e.g., size, case thickness, permeability, and depth).

In another embodiment of the invention, a sensor such as an MWM or MWM-Array may be used to measure properties of objects from a UXO site or objects expected to exist in a UXO site including UXO, UXO fragments, clutter, ground constituents. This information is then used to refine measurement grids or clutter suppression filters. Also, such clutter, background responses and UXO from the site are categorized and used in a library of responses tied to the scanning array signature before they were removed from the ground, to improve future detection and suppression performance by identifying features or setting feature thresholds that separate objects of interest from clutter and background.

Figure 14:
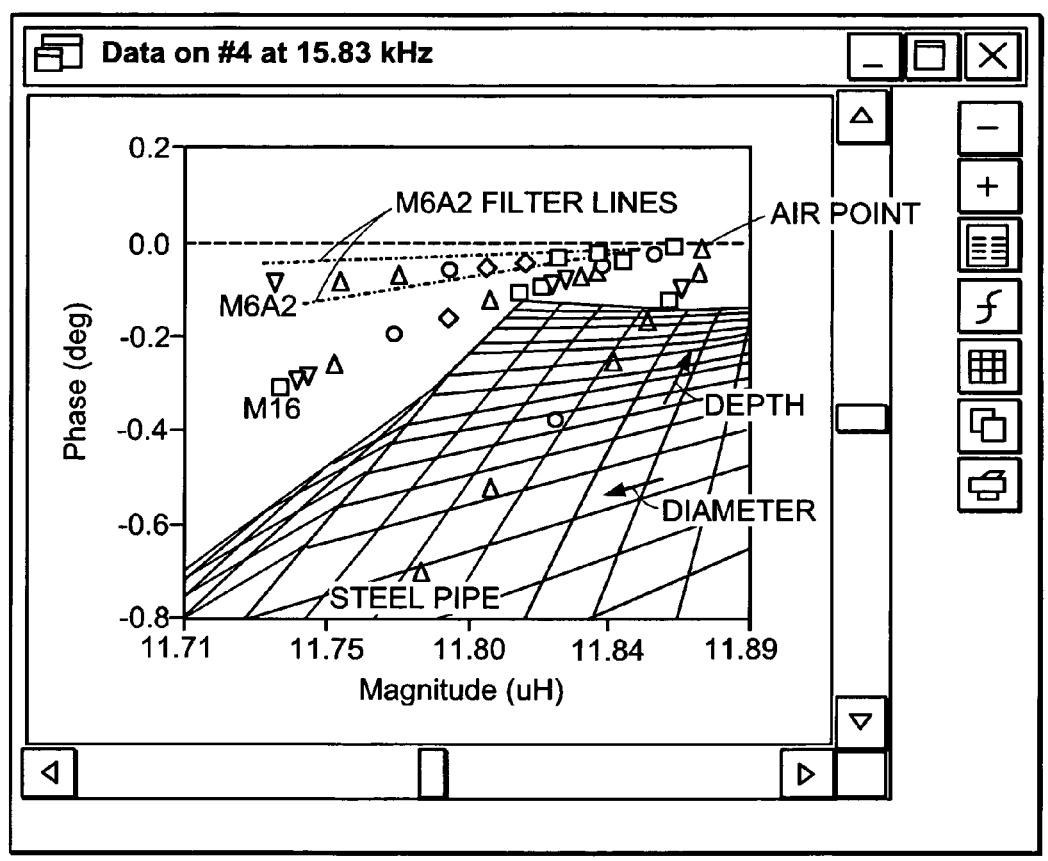
FIG. 14 shows a representative empirically obtained measurement grid relating the magnitude and phase of the sense element terminal impedance to the diameter and depth of steel pipes.

A representative empirical measurement grid illustrating size and depth estimation capabilities, along with a filtering capability, is shown in FIG. 14. This empirically derived measurement grid was created by moving steel pipes of various diameters over a range of depths and measuring the response for an inductive sensing coil directly over the pipes. The measurement response is the transinductance of the sensing coil, which is the transimpedance (coil voltage divided by the drive current) divided by the angular frequency and. Subsequent measurements with a single steel pipe at various depths are shown to essentially fall along a constant pipe diameter grid line and indicate a depth measurement capability using measurement grids.

Figure 15:
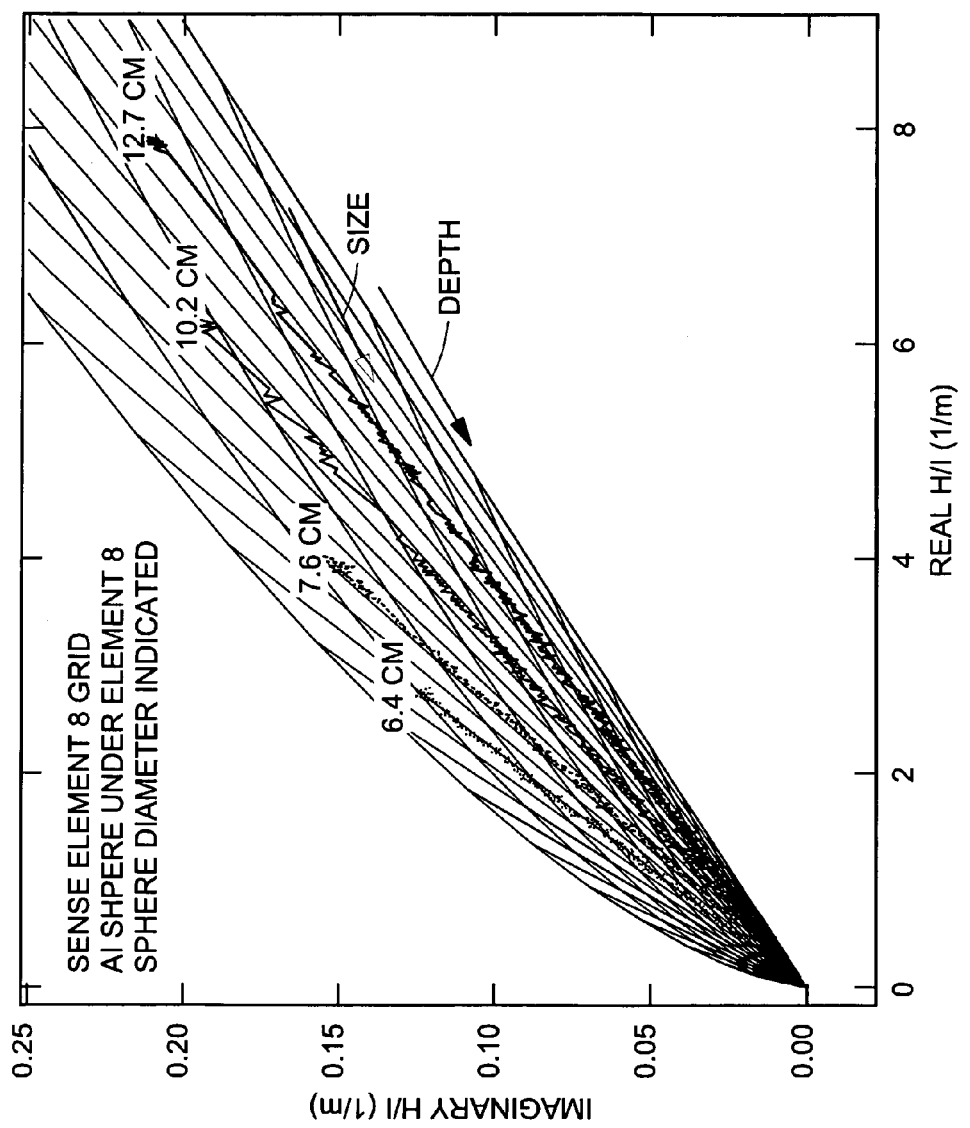
FIG. 15 shows a representative measurement grid relating the real and imaginary parts of the sense element terminal impedance, including the effects of bucking coils, to the diameter and depth of aluminum spheres.

In contrast, measurements with other metallic objects, such as M16 and M6A2 landmines do not fall on the measurement grid and follow lift-off lines that depend upon the material type and size of the object. This allows for the development of specific filters to eliminate clutter. The "M6A2 Filter Lines" indicate M6A2 detection when the measurement data fall between the lines and rejections when the data fall outside the lines. Note that moving the sensor up and down to vary the stand-off (and effective depth of the object beneath the sensor array) permits the use of the shape of the depth lines and not just the individual data points. For large stand-off distances or deep objects, the sensor response approaches the response of the sensor in air (the air point). Also, multiple frequencies provide multiple filters. Such modeling and filtering has limited value when large sensor coils are used. The use of small high-resolution sensor arrays is far more suitable for such model based multiple frequency filtering. Additional information about the object shape is then obtained from high resolution images. FIG. 15 shows the response of sense element near the center of the linear array of FIG. 11 as different size aluminum spheres are lowered beneath the sense element. A model was used to calculate an appropriate measurement grid for the sphere location and properties (e.g., size and electrical conductivity) and for the sense element position and orientation within the drive winding. When the sense element is directly over the object, the measurement grid indicates reasonable sensitivity to the size and depth of the object, as indicated by the relatively large spacing between the grid lines. For each sphere, the model and data show a nonlinear response and the data follows a line of constant size as the depth is varied. The response of offset sense elements shows similar behavior to sense element directly over the object, but with a reduced sensitivity to the object properties.

Figure 16:
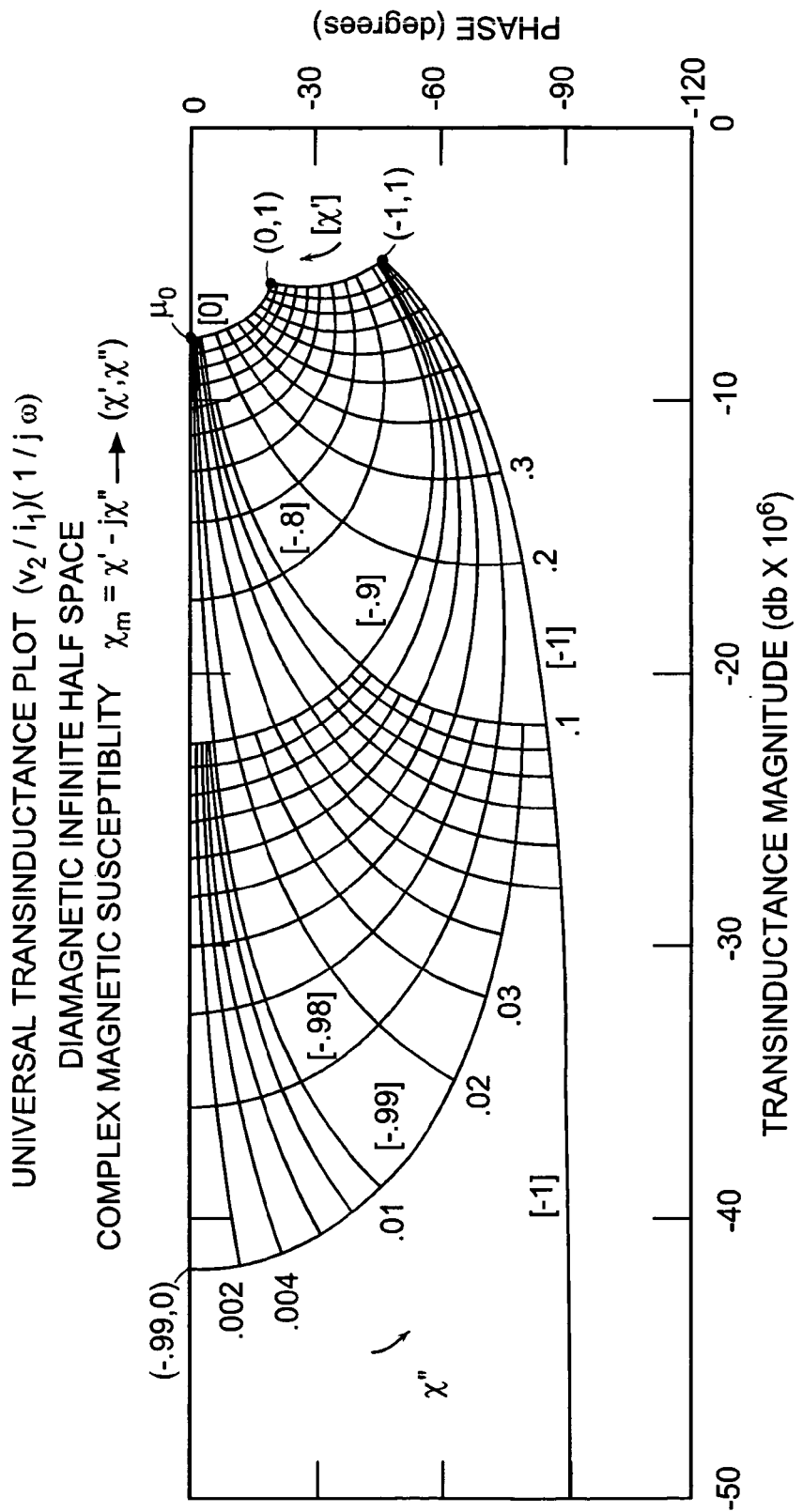
FIG. 16 shows a universal transinductance plot for a diamagnetic infinite half-space.

These grid methods may also be used to determine background material response and object signature responses in terms of its effective complex magnetic permeability. FIG. 16 shows a universal plot of the real and imaginary parts of the magnetic permeability (or susceptibility) for a given sensor geometry, and is described in U.S. Pat. No. 5,453,689. This plot assumes that the material does not have a bulk conductivity; any conduction effects, for example from induced eddy currents, are absorbed into the complex susceptibility. The universal nature of this plot permits the real and imaginary parts of the susceptibility to be determined at any frequency. Furthermore, the transimpedance is an analytic function of the complex susceptibility so that the grid lines are guaranteed to be orthogonal, which simplifies the determination of properties from the grids. An advantage of this approach is that once the characteristic signature response for an object is obtained (in terms of the complex susceptibility) as a function of frequency, variations in the object depth or surrounding material layers can be predicted with models. Although an object is not a single layer, this method has the potential to provide signature libraries independent of object depth. It may also be possible to "morph" the signatures from different orientations and to generate these signatures using finite element or other model based techniques.

These sensor and sensor array constructs permit the high resolution inductive imaging (e.g., using linear arrays of relatively small sensing elements) so that information can be obtained about object shape and orientation. Arrays of small sensing coils (inductive or modified GMR sensors) not only provide high-resolution images of UXO objects, but also of clutter. Imagine a harmless fragment of a UXO sitting above an intact ordnance. The harmless fragment, being closer to the sensor, would substantially alter the sensor response for a single coil or even a low-resolution array. Thus, sufficient resolution to resolve these relatively small near surface clutter objects is required to remove (e.g., deterministically subtract or filter out) their effects and reveal the UXO below.

The capability to create two- and possibly three-dimensional object images provides new capabilities for object discrimination. The use of multiple sensing elements within a single drive winding provides both deep field penetration and high resolution imaging capability. The positions of the sensing elements are known and spatially registered with respect to one another so that a simple scan in one direction readily permits the creation of a two-dimensional object image. In the simplest sense, images of the raw data processed only with, for example, moving average filters to remove some measurement noise, can be used to determine the shape and orientation of the buried object. More sophisticated processing of the data for extracting multidimensional information about the buried object can also be applied. For example, the data can be processed to determine the three orthogonal dipole moments for the object as part of an object classification procedure. The object data can be compared to a library or database of object dipole moments and searched to determine the object, if any, that matches the dipole moments at one or more excitation frequencies. As another example, grid methods can also be applied where the appropriate grid is used even for a sensing element in one location and an object in another. This provides an estimate of the object properties from each array element and a large amount of complementary information that might be used to improve property estimates and image quality, while ultimately supporting 3-dimensional object reconstruction.

For measuring the response of the individual sensing elements in an array, multiplexing between the elements can be performed. However, this can significantly reduce the data acquisition rate so a more preferably approach is to use an impedance measurement architecture that effectively allows the acquisition of data from all of the sense elements in parallel. Furthermore, ability to measure the MUT properties at multiple frequencies extends the capability of the inspection to better characterize the material and/or geometric properties under investigation. This type of instrument is described in detail in U.S. patent application Ser. No. 10/155,887, filed May 23, 2002, the entire teachings of which are incorporated herein by reference. The use of multiple sensing elements with one meandering drive and parallel architecture measurement instrumentation then permits high image resolution in real-time and sensitivity with relatively deep penetration of fields into MUT.

Figure 17:
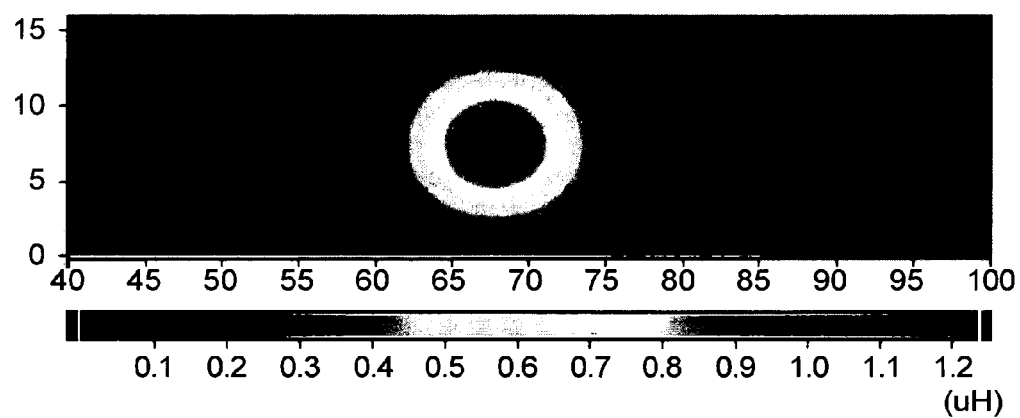
FIG. 17 shows the array magnitude response over a 12.7 cm (5 in.) diameter aluminum sphere at a depth of 10 cm (4 in.).

Imaging resolution depends on not only the density and size of the secondary element array, but also on scan speeds, data rates, and object depth (the magnetic fields diffuse as the propagate to the buried object and back to the sensing elements). Images can be created with a two-dimensional array of secondary elements or with a single "line" of secondary elements that are scanned over a surface. FIG. 17 shows a representative image of the magnitude response as a linear array of 16 sense elements is scanned over an aluminum sphere. In this case, the sense elements were circular 300 turn coils approximately 1.9 cm (0.75 in.) in diameter and spaced approximately 2.54 cm (1 in.) apart. A position encoder was used to record the scan position. The axes of the image are in inches. The sphere is clearly present and this relatively high resolution array captures the inductive image of the sphere, albeit with a modest elongation in the scan direction. Similar images can be created for the real (in-phase) and imaginary (quadrature phase) components of the signal. Depending upon the object, one or the other components may be dominant.

Figure 18:
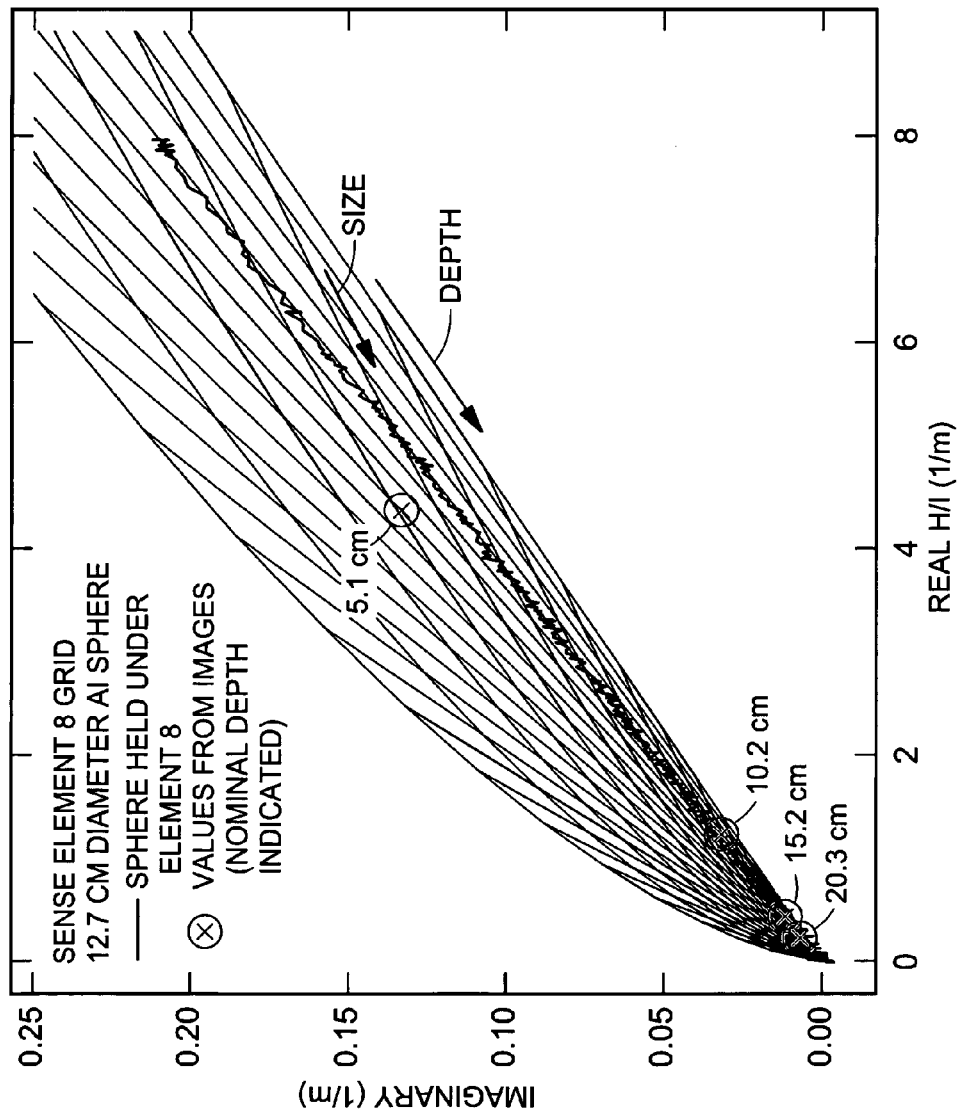
FIG. 18 shows the response of the sensor array to a 12.7 cm (5 in) diameter aluminum sphere.

An image itself is not adequate for object classification though. The imaging capability of the array serves to provide shape information about the object being detected and also allows the secondary elements to be centered over the object. Once over the object, the measurement data can be plotted on a grid so that size or material classification and clutter suppression algorithms can be applied. FIG. 18 shows the image response data in conjunction with a measurement grid. The data points were taken from the peaks in the images in the real and imaginary components of the impedance. This data compares favorably with the measurements taken as the aluminum sphere was lowered by hand beneath the center sense element. The minor differences in the measurements can be attributed to hand held measurements being slightly off the center line of the sense element.

Figure 19:
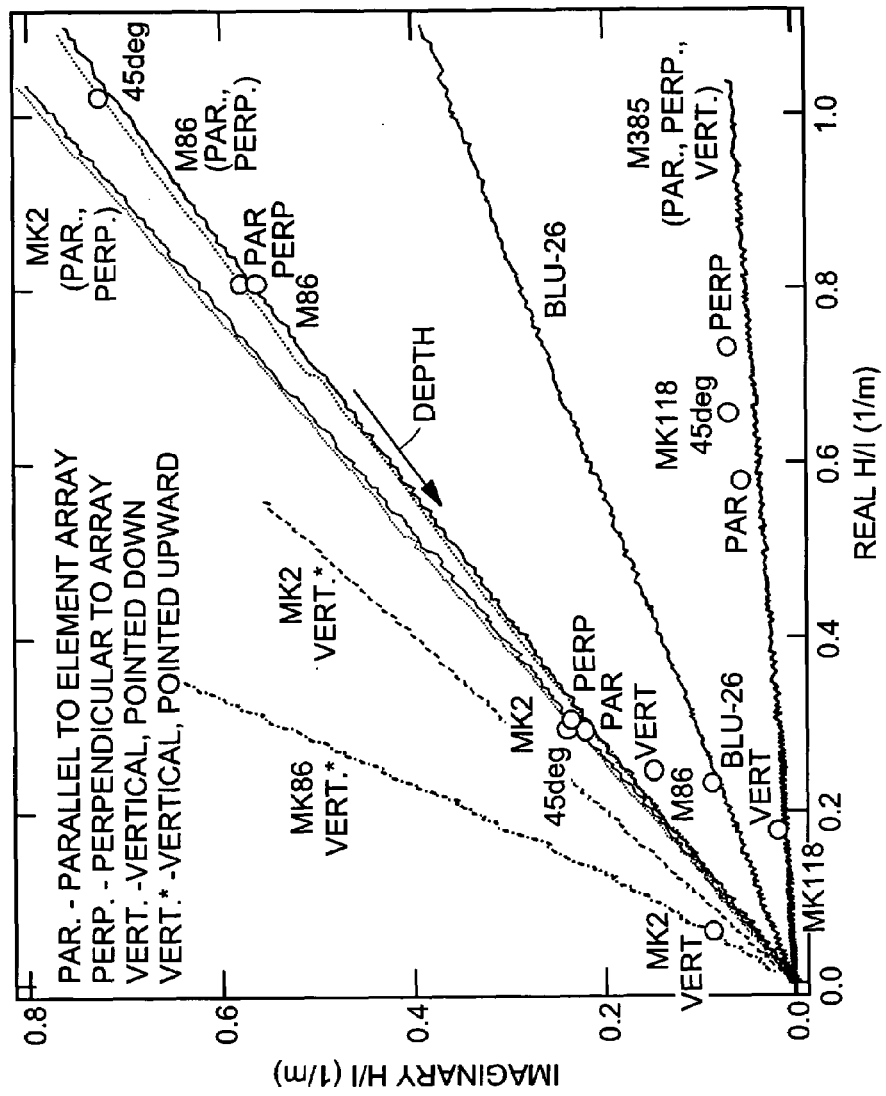
FIG. 19 shows the impedance response of the sensor array to several UXO at different orientations.
Figure 20:
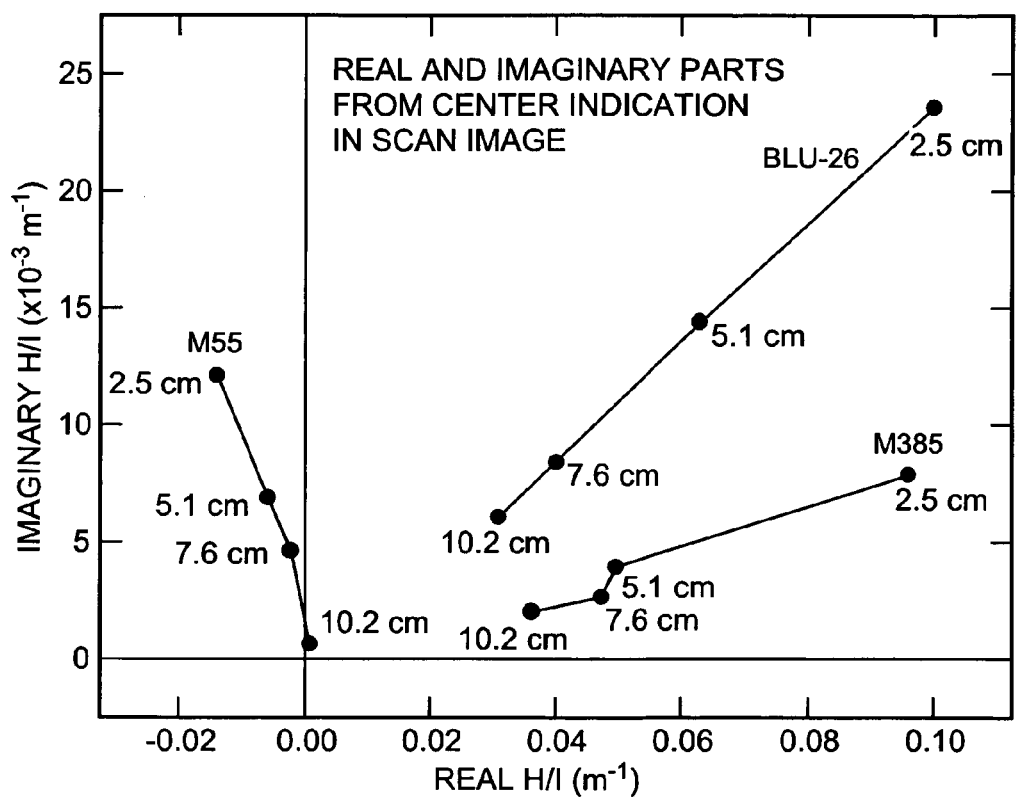
FIG. 20 shows the impedance response of the sensor array to several buried UXO at different lift-offs.
Figure 21A:
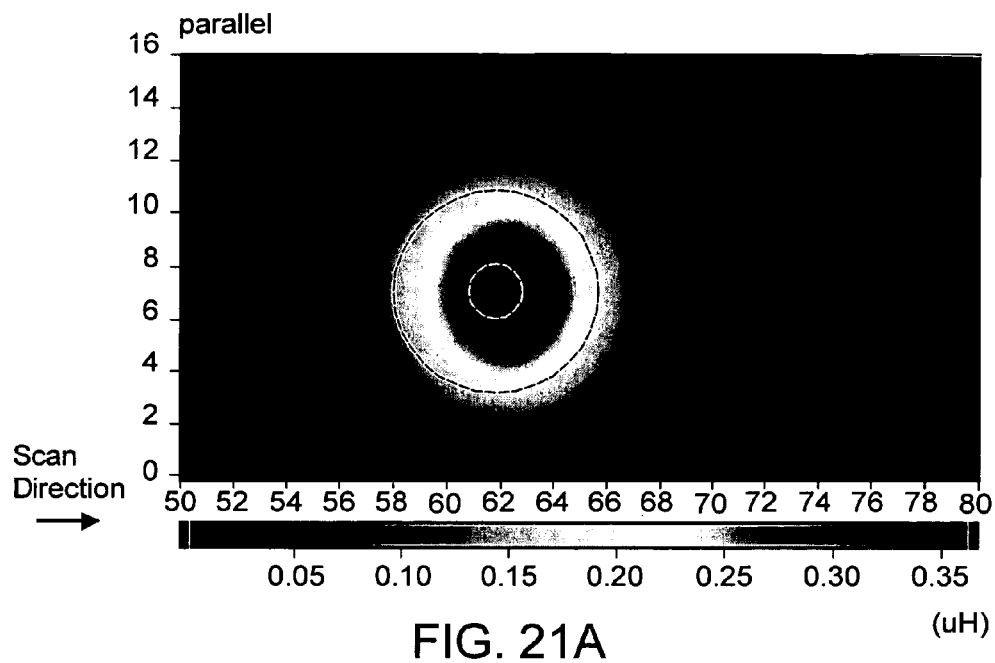
FIG. 21A shows a magnitude scan image over an MK2 oriented parallel to the linear array of sense elements.
Figure 21B:
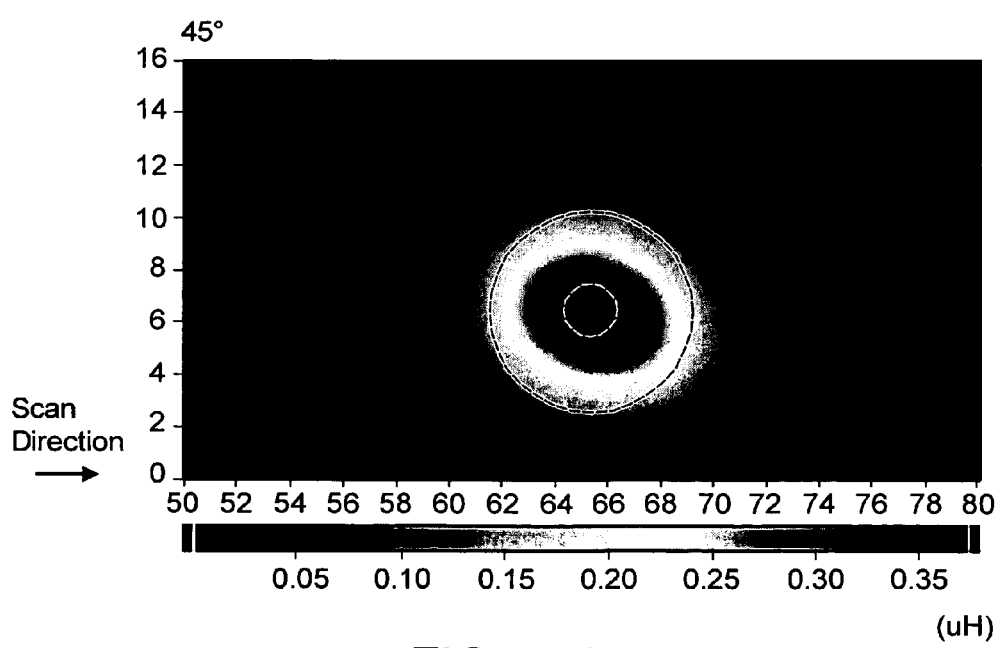
FIG. 21B shows a magnitude scan image over an MK2 oriented at a 45° angle to the linear array of sense elements.
Figure 21C:
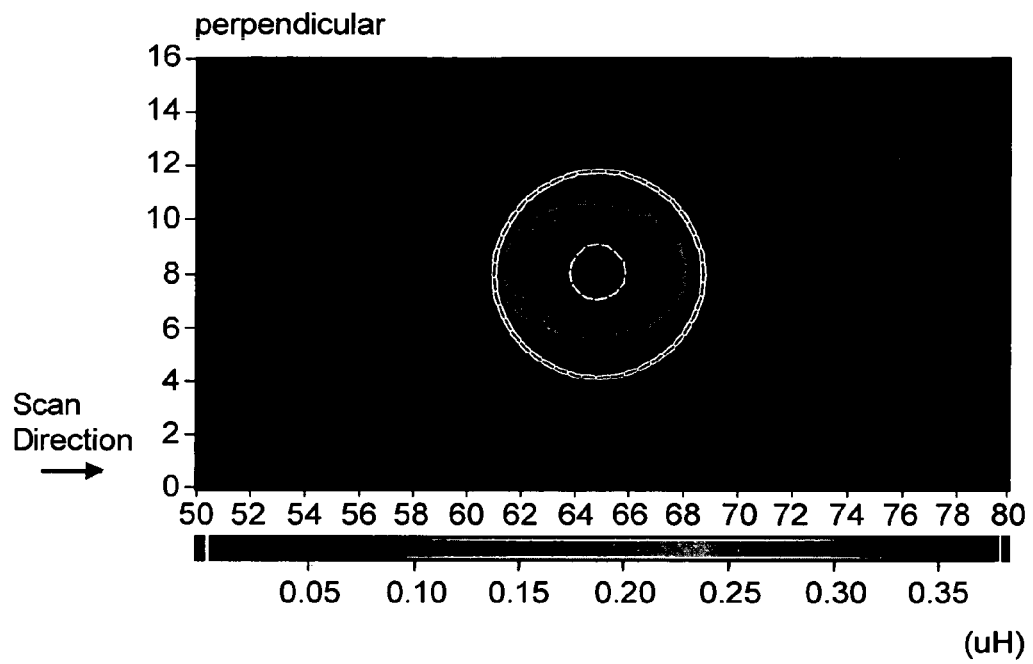
FIG. 21C shows a magnitude scan image over an MK2 oriented perpendicular to the linear array of sense elements.
Figure 21D:
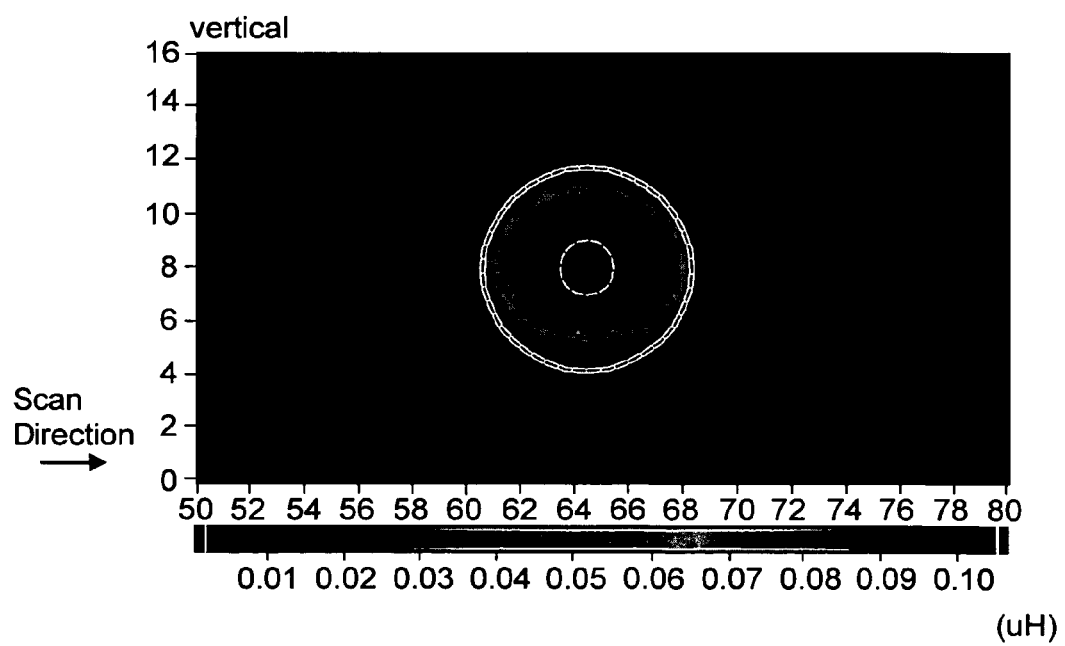
FIG. 21D shows a magnitude scan image over an MK2 oriented vertically (pointed downward away from the array).

Similar measurements were performed on several types of UXO, as illustrated in FIG. 19. Again, the lines indicate the measurement response as the UXO was held beneath the center sense element and lowered until the air or null response was obtained. The symbols (dots) denote the peak values of the real and imaginary portion of the response taken from scan images as the array is passed over the UXO. For the non-rotationally symmetric UXO, the orientation was also varied, with the longest axis for the UXO either parallel, perpendicular, or at a 45° angle to linear of sense elements, or with the UXO oriented vertically with the point up (toward) or down (away from) the sensor array. The various different UXO have different base impedance values depending upon the materials used in constructing them and the orientation of the UXO. Some (e.g., M385) have a predominantly real response. Others (e.g., MK2 and M86 in the vertical orientation) have a most signficant imaginary response. Yet others (e.g., BLU-26) have significant real and imaginary signal components. Similar results have been obtained for buried UXO, as shown in FIG. 20, at several lift-offs over the ground surface.

The impedance values for the measured response of FIG. 19 were then processed using sphere model grids to determine the effective size and depth of the object. The same grid was used for each orientation of an object. Different grids, based on nominal electrical properties, were used for each object, except for the MK2 and the M86 which used the same grid. These results, given in Table 3, are in reasonable agreement with the nominal object sizes. Note that the UXO are generally not spherical so that the sphere model is not truly appropriate; however, it does provide a reasonable estimate of the object properties. Furthermore, this is a simple use of a model for estimating properties. Only a single value from the scan image is used to estimate the object properties. Better estimates are expected when the nonspherical (e.g, ellipsoidal) shape is accounted for and the responses from multiple sense elements are used.

TABLE 3

Estimated properties for the UXO measurements

| UXO | Orientation | Nominal Properties | | | Image Response | | Estimated Properties | |
| --- | --- | --- | --- | --- | --- | --- | --- | --- |
| | | Diameter (cm) | Length (cm) | Depth (cm) | Real (1/m) | Imag. (1/m) | Diameter (cm) | Depth (cm) |
| BLU-26 | | 6.4 | | 13.2 | 0.2304 | 0.0853 | 5.50 | 13.38 |
| MK2 | parallel | 4.0 | 15.9 | 12.0 | 0.2916 | 0.2192 | 6.69 | 13.54 |
| MK2 | perpendicular | 4.0 | 15.9 | 12.0 | 0.3028 | 0.2333 | 6.59 | 13.14 |

TABLE 3-continued

Estimated properties for the UXO measurements

| | | Nominal Properties | | | Image Response | | Estimated Properties | |
|---|---|---|---|---|---|---|---|---|
| UXO | Orientation | Diameter (cm) | Length (cm) | Depth (cm) | Real (1/m) | Imag. (1/m) | Diameter (cm) | Depth (cm) |
| Mk2 | 45 deg | 4.0 | 15.9 | 12.0 | 0.2931 | 0.2374 | 6.39 | 12.82 |
| MK2 | vertical | 4.0 | 15.9 | 17.9 | 0.0609 | 0.0864 | 4.82 | 14.09 |
| M86 | parallel | 5.7 | 16.0 | 12.9 | 0.8059 | 0.5769 | 6.90 | 10.41 |
| M86 | perpendicular | 5.7 | 16.0 | 12.9 | 0.8058 | 0.5604 | 7.03 | 10.62 |
| M86 | 45 deg | 5.7 | 16.0 | 12.9 | 1.0200 | 0.7264 | 6.92 | 9.71 |
| M86 | vertical | 5.7 | 16.0 | 18.0 | 0.2448 | 0.1465 | 7.78 | 16.60 |
| MK118 | parallel | 4.5 | 21.6 | 12.3 | 0.5776 | 0.0548 | 4.44 | 9.11 |
| MK118 | perpendicular | 4.5 | 21.6 | 12.3 | 0.7304 | 0.0690 | 4.46 | 8.51 |
| MK118 | 45 deg | 4.5 | 21.6 | 12.3 | 0.6547 | 0.0675 | 4.10 | 8.07 |
| MK118 | vertical | 4.5 | 21.6 | 20.8 | 0.1760 | 0.0178 | 4.18 | 12.42 |

Figure 22A:
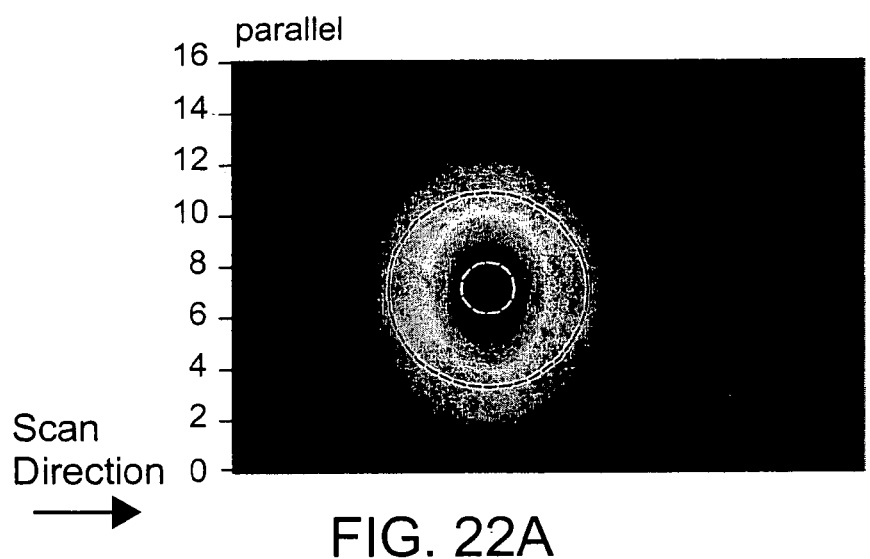
FIG. 22A shows a compensated magnitude scan image over an MK2 oriented parallel to the linear array of sense elements.
Figure 22B:
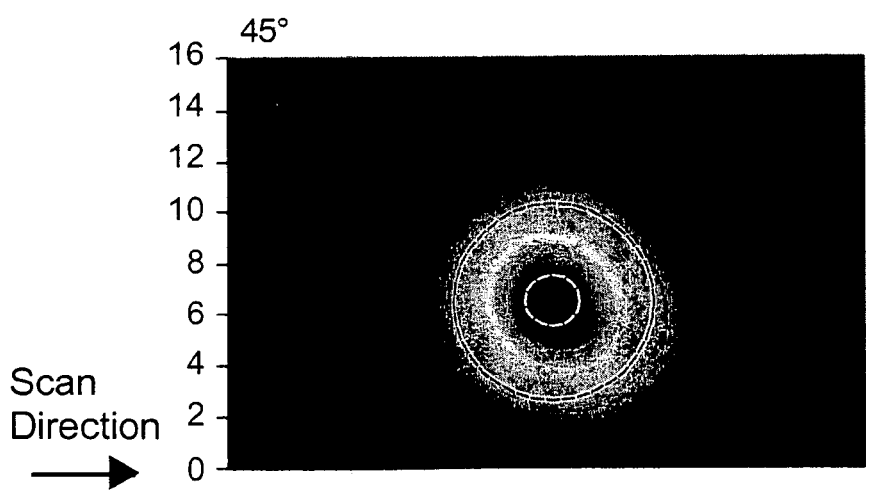
FIG. 22B shows a compensated magnitude scan image over an MK2 oriented at a 45° angle to the linear array of sense elements.
Figure 22C:
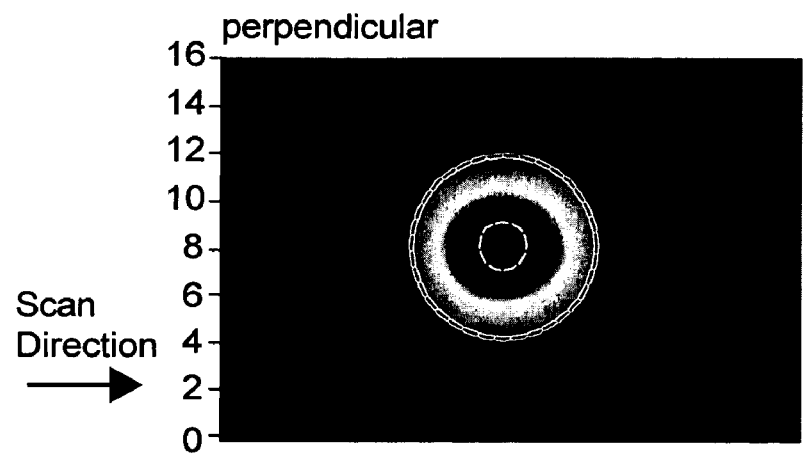
FIG. 22C shows a compensated magnitude scan image over an MK2 oriented perpendicular to the linear array of sense elements.
Figure 22D:
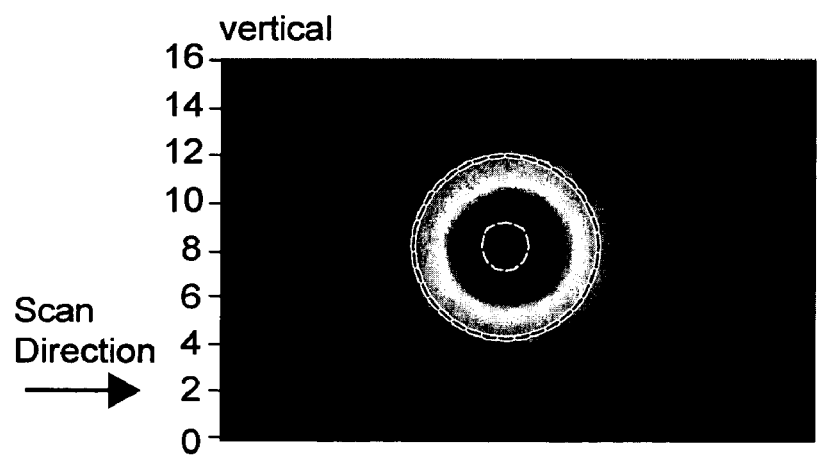
FIG. 22D shows a compensated magnitude scan image over an MK2 oriented vertically (pointed downward away from the array).

FIG. 21 shows the effect of object orientation on the scan images. In this case, measurement scans were performed over an MK2 UXO, which has tapered shape with an approximate diameter of 4 cm and a length of 16 cm. Measurements were performed with the longest axis either parallel, perpendicular, or at a 45° angle to linear of sense elements, or with the UXO oriented vertically with the point down (away from the sensor array). These images show that scans with the linear array of sense elements can capture the orientation of objects, but the non-uniform field distribution across the elements of the sensor array can perturb the image and distort it when being displayed. As a simple example, this can be caused by the return or edge portions of the drive winding being close to the outermost or edge elements of the sensor array. Then, an image obtained by scanning the array over an object can be distorted at the sides. When scanning across, for example, a pipe, the image response may show a bulging of the response in the center area and reduction in signal from the side elements. When looking at high aspect ratio UXO, this can cause the image of an object oriented parallel to the sense elements (as shown in the FIG. 21A) to compressed and look almost circular. When the object is perpendicular to the array (FIG. 21C), it becomes unnecessarily elongated and, when placed at an angle (FIG. 21B), the image angle does not correspond precisely with the physical orientation of the object. When pointed downward (FIG. 21D), the image is not necessarily circular and reflecting the symmetry of the object. This effect can be reduced by lengthening the primary winding drive conductors so that the return segments are even further from the sense elements. Alternatively, the distortion of the image can be compensated by using analytical or empirical techniques that correct for the non-uniformity of the field across the array elements. Analytically, this can be accomplished if models for the array response to objects can be modeled accurately. Empirically, this can be accomplished by adjusting the array image to tune or standardize the response over a known object, such as a sphere or a long object in a vertical orientation, and then processing any other images using the correction procedure. For example, in FIG. 22D, the vertical orientation image was adjusted so that the response was circular to match the symmetry of the object. This simple adjustment involved compressing the horizontal scale for the image. The resulting effects on the other images show the elongation of the parallel response image (FIG. 22A), which shows the aspect ratio of the object, a more appropriate aspect ratio for the perpendicular orientation (FIG. 22C), and the correct angle for the 45° orientation (FIG. 22B). In addition to stretching or compression of the images, other operations such as subtraction or division by a model-based or empirically known response, can be performed.

Figure 23A:
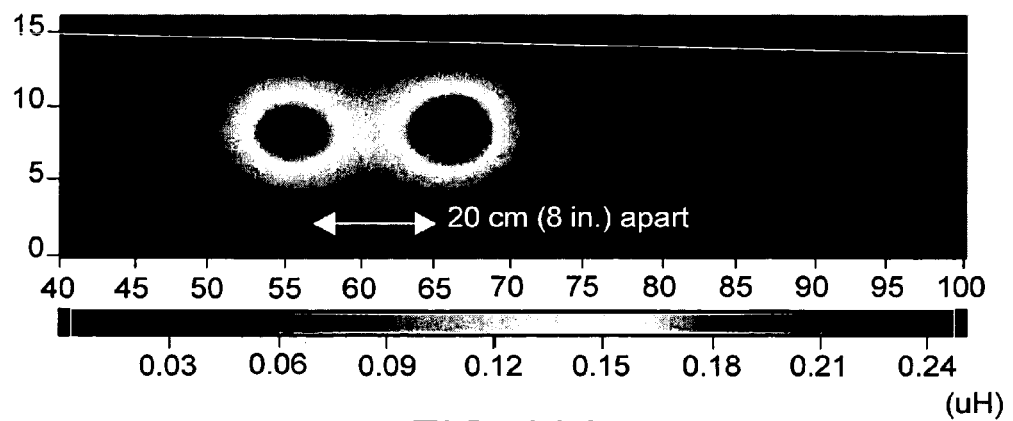
FIG. 23A shows a magnitude scan image over two BLU-26 bomblets at a 10 cm depth and separated by 20 cm.
Figure 23B:
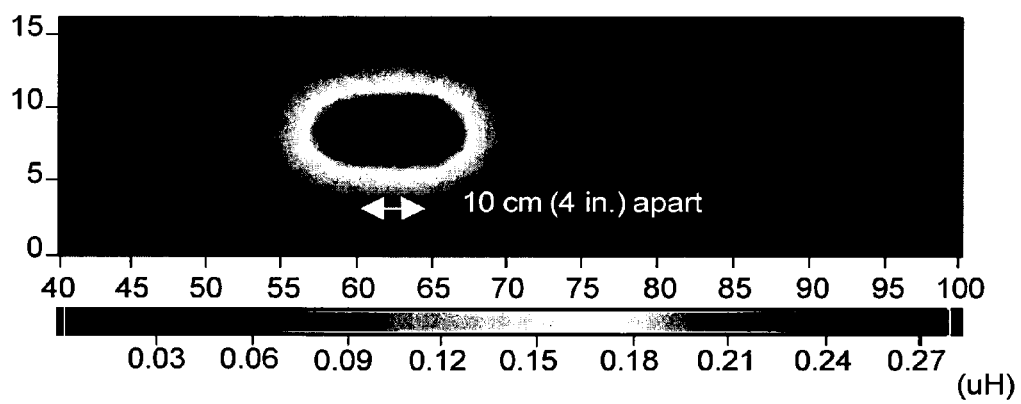
FIG. 23B shows a magnitude scan image over two BLU-26 bomblets at a 10 cm depth and separated by 10 cm.
Figure 23C:
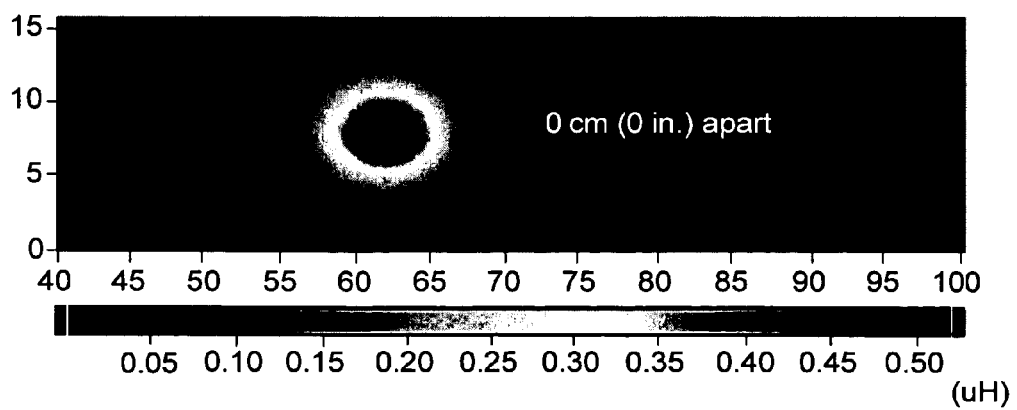
FIG. 23C shows a magnitude scan image over two BLU-26 bomblets at a 10 cm depth and touching.

High resolution imaging can also be used to resolve the presence of multiple objects. FIG. 23A, FIG. 23B, and FIG. 23C shows several response images for a pair of bomblets aligned perpendicular to the sense element array. At shallow depths and with large separation distances, the response of each bomblet is distinct. For deeper depths and smaller separation distances, the interactions between the objects become more apparent and the diffusion of the magnetic field response leads to an overlap of the effective response and an apparent "single" object response. This response has an effective orientation associated with alignment of the objects and also local maxima that are associated with the center of the objects. For very deep objects and for very small separations, the effective orientation of the response becomes less apparent and symmetric responses result. The use of a high resolution imaging array allows the spatial variations of the response from the objects to be captured, including orientation and local maxima and minima in the response that may permit separation of object responses.

Simulations have confirmed that interactions between objects can also have an effect on the measurement response. In these simulations a square coil was chosen as a realistic and common excitation source. Assuming that the wires are infinitely thin "current sticks" and carry a constant current, then the field can be determined from the Biot-Savart Law as [Haus]

$$\bar{H} = \frac{I}{4\pi} \frac{\bar{c} \times \bar{a}}{|\bar{c} \times \bar{a}|^2} \left( \frac{\bar{a} \cdot \bar{c}}{|\bar{c}|} - \frac{\bar{a} \cdot \bar{b}}{|\bar{b}|} \right) \quad (1)$$

where, I is the current in the current stick, $\bar{b}$ is a vector from the observation point to the start of the stick, $\bar{c}$ is a vector from the observation to the end of the stick and $\bar{a} = \bar{c} - \bar{b}$. The excitation field at each object location is obtained by summing the contribution from each of the four legs of the square coil.

Figure 24A:
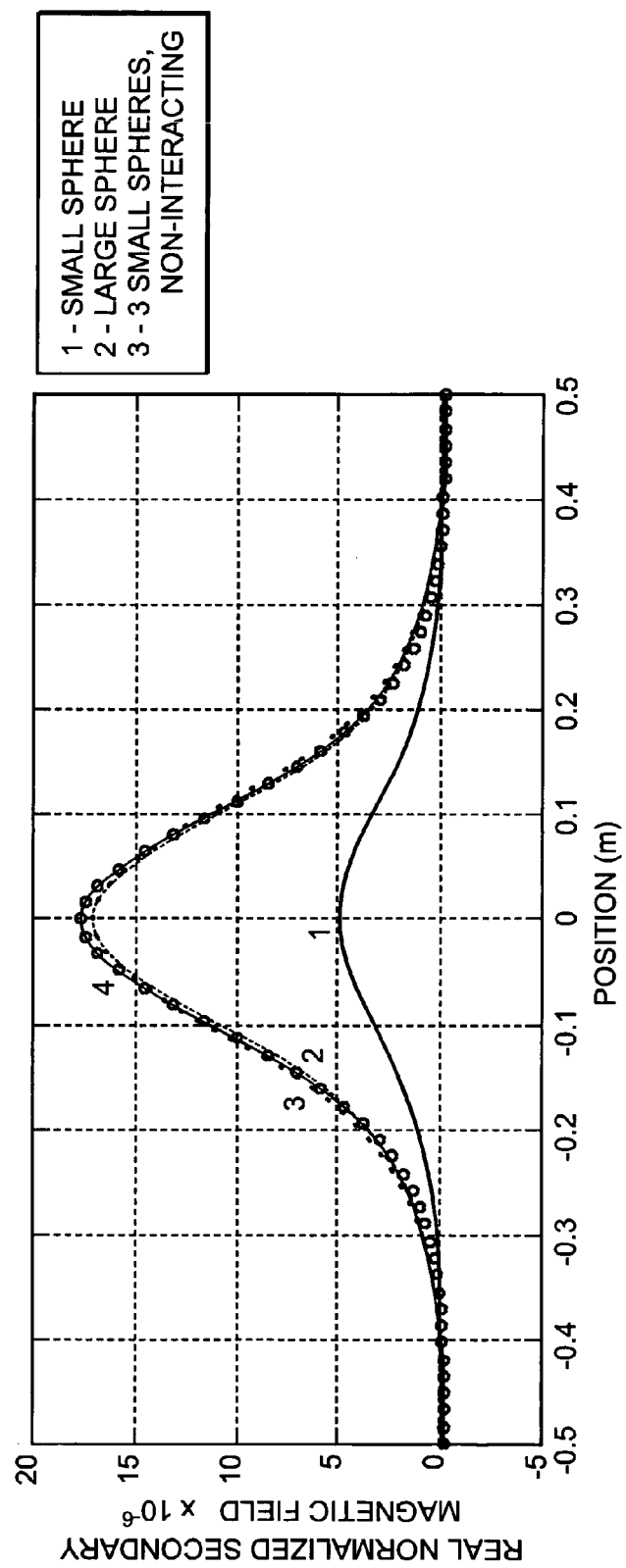
FIG. 24 shows plots of the real and imaginary portions of the induced magenetic field for several sphere configurations translated across a square coil operating at 15 kHz.
Figure 24B:
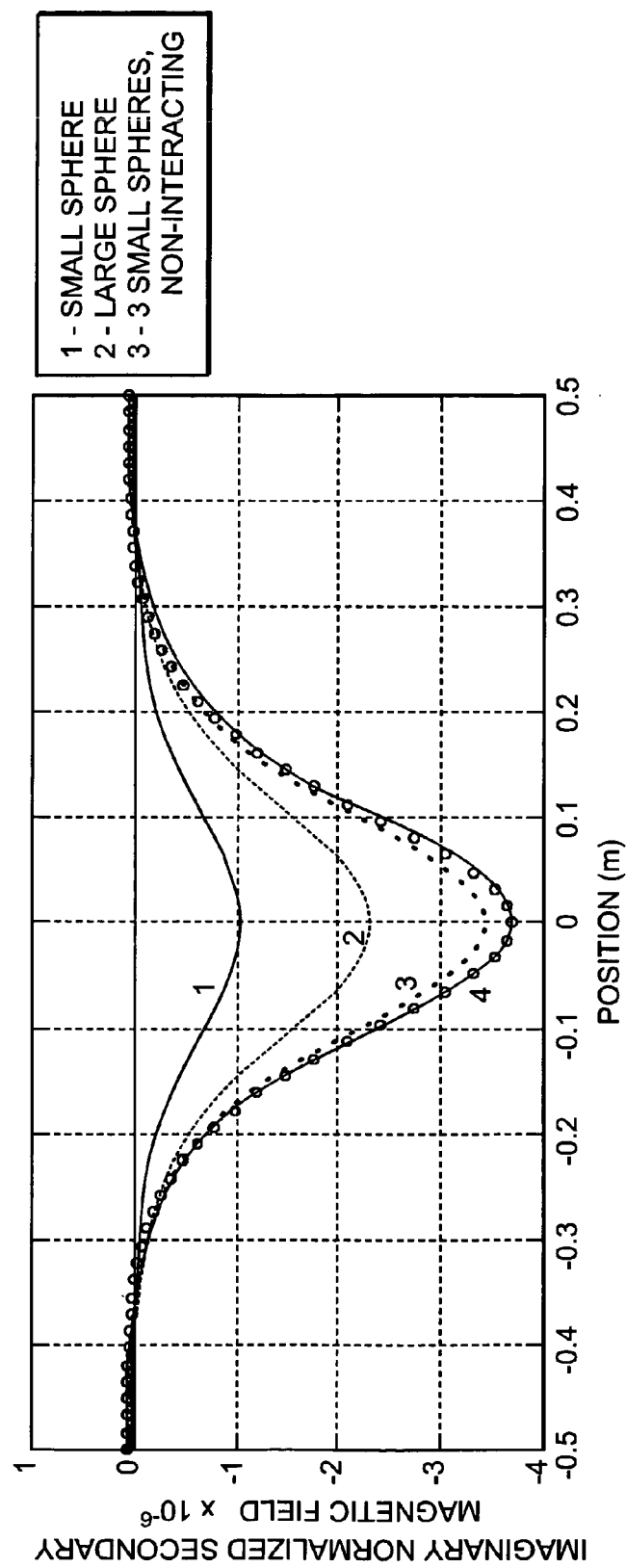

FIG. 24 shows the resulting induced or secondary magnetic field intensity parallel to the coil axis and at the center of the coil as the coil is scanned over one or more spheres. The excitation frequency was 15 kHz, the coil was a square with 10 cm sides, and the sphere conductivity was 107 S/m. The configurations considered were 1) a single 1 cm diameter sphere, 2) a single 1.48 cm diameter sphere, and 3) three 1 cm diameter spheres stacked vertically with a 3 cm center-to-center distance. The effects of ignoring the interactions are especially noticeable in the imaginary part of the response. The size of the large sphere was chosen to produce a real response equal to that of the three interacting smaller spheres.

The imaginary response is very different though between these two configurations, indicating that there is information that can be used to discriminate between a large object and multiple smaller objects.

An alternative method for characterizing hidden objects or flaws within a MUT is to subdivide the region of interest into volume elements or voxels and then reconstruct or determine the equivalent sources within the region. These effective sources can represent large objects that span numerous voxels or multiple objects. Filtering routines can then be applied to the effective sources that are obtained for additional characterization of anything that is detected.

Figure 25:
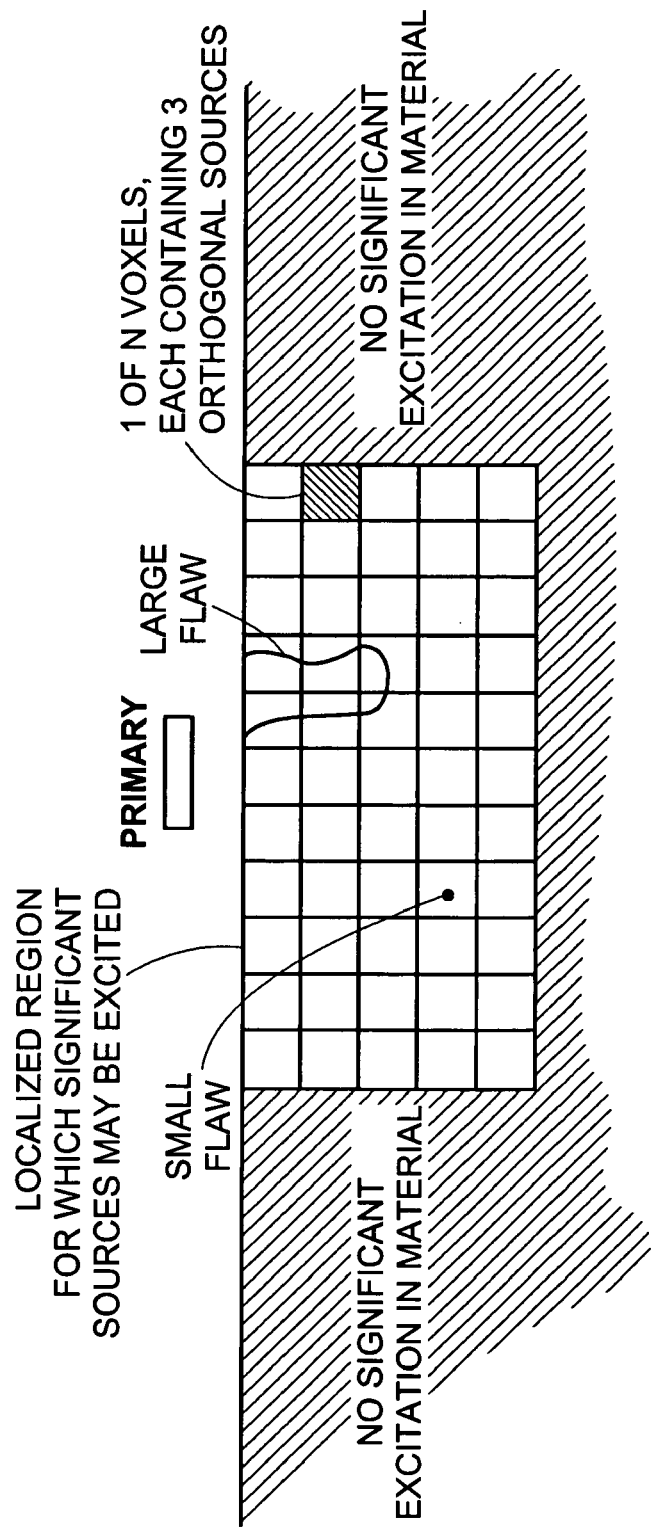
FIG. 25 is a schematic of a localized region of the MUT in proximity to primary winding for which the field produced directly by the primary winding may induce significant magnetization currents and/or eddy currents. This region is subdivided into voxels that contain source representations to approximate induced sources in the material.

Source reconstruction attempts to reconstruct the current sources induced in the MUT using measurements of the magnetic fields taken exterior to the MUT. These current sources represent a combination of eddy currents and magnetization currents (for magnetically permeable materials) resulting from the external field produced by the sensor's primary winding and are determined by the geometry and electrical properties throughout the volume of the MUT. The structure and position of the primary windings will limit the region of the MUT for which it is possible to excite significant sources, and therefore control the volume of the MUT being interrogated at any specific time. The region local to the primary winding of the MWM has a significant magnetic field excitation and is the region of the MUT being interrogated by the MWM. This local region is then subdivided into smaller regions or voxels, as shown in FIG. 25, each of which is assumed to contain a current source, for which the value of the current needs to be determined. The voxels may be cubic or have unequal dimensions in each direction. Material excitation near large objects or flaws is described by multiple voxels while small objects or flaws alter the effective excitation for the voxel in which it is contained. The voxels can span a portion of the volume of the component near the surface or the voxels can span the entire thickness of a part to represent, for example, hidden corrosion and cracks on the opposite side of a part.

Figure 26:
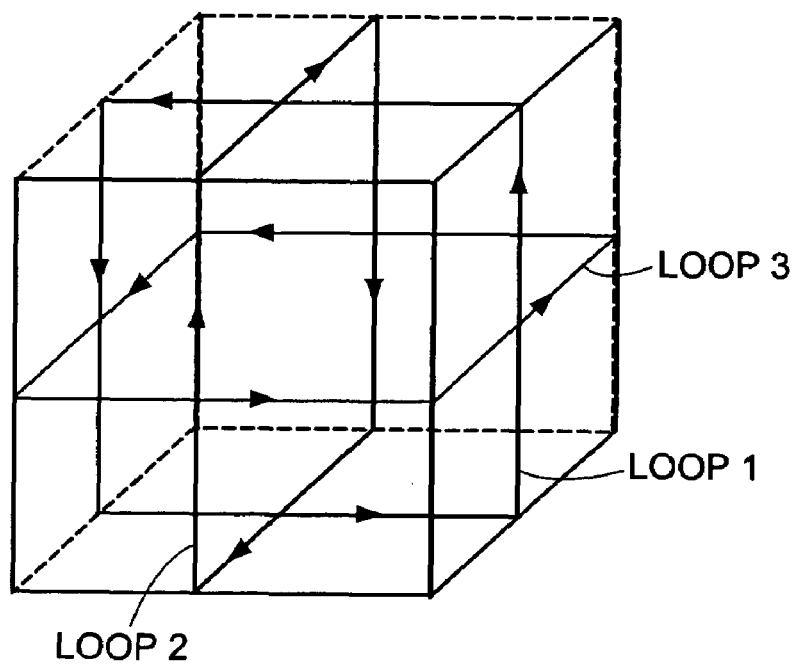
FIG. 26 shows a source representation for a voxel composed of three orthogonal current loops, each carrying a current for which a complex current value will be determined during source reconstruction.

Although there are several possible choices for the form of the current source within each voxel, one possible choice is shown in the FIG. 26. This form for the source within the voxel has several advantages. The use of current loops, rather than currents that possess starting and ending points guarantees that all solutions for the current sources are solenoidal as required by the assumption that the system is MQS. The use of straight line current segments for the loop corners allows the fields from each corner segment to be easily evaluated using the Biot-Savart Law presented previously. Loop segments from neighboring voxels are coincident allowing uniform current flows to be better approximated since equal and opposing currents on voxel edges can cancel exactly.

Alternatively the source within the voxel could be constructed from three orthogonal circular current loops. This also would guarantee a solenoidal current distribution in the MUT. The far-field solution for the magnetic field from a current loop is that of a dipole, which is also easily evaluated. The main difference from the square coils lies in the coincidence of coil segments, although in the far field where most magnetic fields will be evaluated, this should not be of great importance. As another alternative, three orthogonal dipoles could be placed in the center of the voxel and the sources evaluated in terms of dipole moments. The following expression relates the fields at vector position $\bar{r}_m$ to the dipole moment $\bar{m}_n$ located at vector voxel center position $\bar{r}_n$:

$$\bar{H}_n(\bar{r}_m) = \frac{3(\bar{i}_{mn})^T \bar{i}_{mn} - \bar{\bar{I}}}{4\pi r_{mn}^3} \cdot \bar{m}_n \qquad (2)$$

Where $\bar{i}_{mn} = (\bar{r}_m - \bar{r}_n)/r_{mn}$ and $r_{mn} = |\bar{r}_m - \bar{r}_n|$. The merits of these choices and other possible source representations will need to be evaluated in practice.

Once the region of the MUT has been subdivided into voxels, the current source representation for the actual current values inside each voxel must be determined. For the source representation shown, each voxel contains three unknowns, one for each loop current. Each of these unknown currents will typically be a complex number representing the time harmonic value for a given excitation frequency. If the volume has been subdivided into N voxels, then there will be 3N unknown complex currents. A minimum of 3N complex measurements of the magnetic field will then be required in order to reconstruct the currents. The representations previously described for the sources within each voxel allow the magnetic fields to be evaluated at any position exterior to the MUT such that the field is proportional to the unknown loop current. This linear relationship allows a system of linear equations to be formed relating the unknown source currents to the field measured by the sensor secondary elements. Inverting this linear system of equations completes the source reconstruction. After the equivalent sources have been obtained, the reconstructed sources can be utilized for MUT imaging in several ways. This includes discontinuity extraction, reconstruction of electrical and effective electrical properties, and using localized voxels for partially defined structures.

One use of the reconstructed sources is for extraction of information about discontinuities. Assuming a sufficiently high density of voxels can be achieved, discontinuities in electrical properties resulting from material flaws, fasteners, layers, etc., should correspond to discontinuities or rather abrupt changes in reconstructed sources. One possible means of producing a single three dimensional image from the many source reconstructions utilizes these abrupt changes in the following way. First the individual source reconstructions at various primary positions and excitation frequencies are spatially high-pass filtered to reveal boundaries and edges. Next these high frequency discontinuities are superimposed maintaining their correct position within the MUT resulting in the three dimensional image of the edges and discontinuities.

Another utilization of the reconstructed source distributions is in the recovery of self consistent electrical properties for each voxel. This utilizes the excitation field distribution which can be theoretically calculated from the primary winding structure and again requires the size of the voxels to be small on the scale of the true magnetic field and current variations excited within the MUT. In this method each voxel is considered a point at which the MQS form of Maxwell's equations must be obeyed for the current source reconstruction and the fields produced by both the sources and the excitation field, given a set of constitutive laws based on the estimated electrical properties of the voxel. Two constitutive laws are required, one relating the current density to the electric field intensity and one relating magnetic flux density to magnetic field intensity for each voxel. In the case where the voxels are small compared to the variations in the actual electrical properties and geometry of the materials, the self-consistent electrical properties will match the actual electrical properties of the material, which may be anisotropic. If the voxel is large compared to geometric features or actual electrical property variations, but still small enough compared to field and current variations such that the fields and currents can be considered uniform over the voxel, then the voxel can be characterized approximately by effective electrical properties. In order for the effective electrical properties to more accurately approximate the response of the voxel to the applied fields, a full conductivity tensor and permeability tensor may be utilized. The use of effective electrical properties is most accurate and self-consistent when the physical contents of the voxel consist of many uniformly distributed features such as many micro-cracks in a uniform material and are less accurate when used to describe single or discrete features.

A third approach somewhat different from the others previously described can be utilized when a majority of the MUT structure is known so that the effect of the flaw is a perturbation of the field inside the material. For example if the MUT is composed of consistent layered materials for which the response of the material to the excitation fields can be accurately predicted and only flaws isolated to certain regions of the MUT exist, then it may be sufficient to place perturbation voxels in these isolated regions only. These voxels essentially model the variations in the material from the expected values and provide a method of localized imaging, which would significantly reduce the number of unknowns over a full reconstruction of an arbitrary MUT.

The geometry, arrangement, and application of the drive winding and sensing elements of the sensor array play a critical role in determining the ultimate resolution of the three-dimensional images and also the properties that can be estimated. The two-dimensional layered media representation is relatively insensitive to many of these considerations because it is aimed at relatively low resolution images. In contrast, the source based reconstruction with voxels is more sensitive to these considerations since high resolution images may be obtained. These considerations even affect the ability for this inversion to provide an accurate source reconstruction. In particular, inversions of this kind are typically susceptible to measurement noise, so that accurate magnetic field and location measurements become critical.

Figure 10:
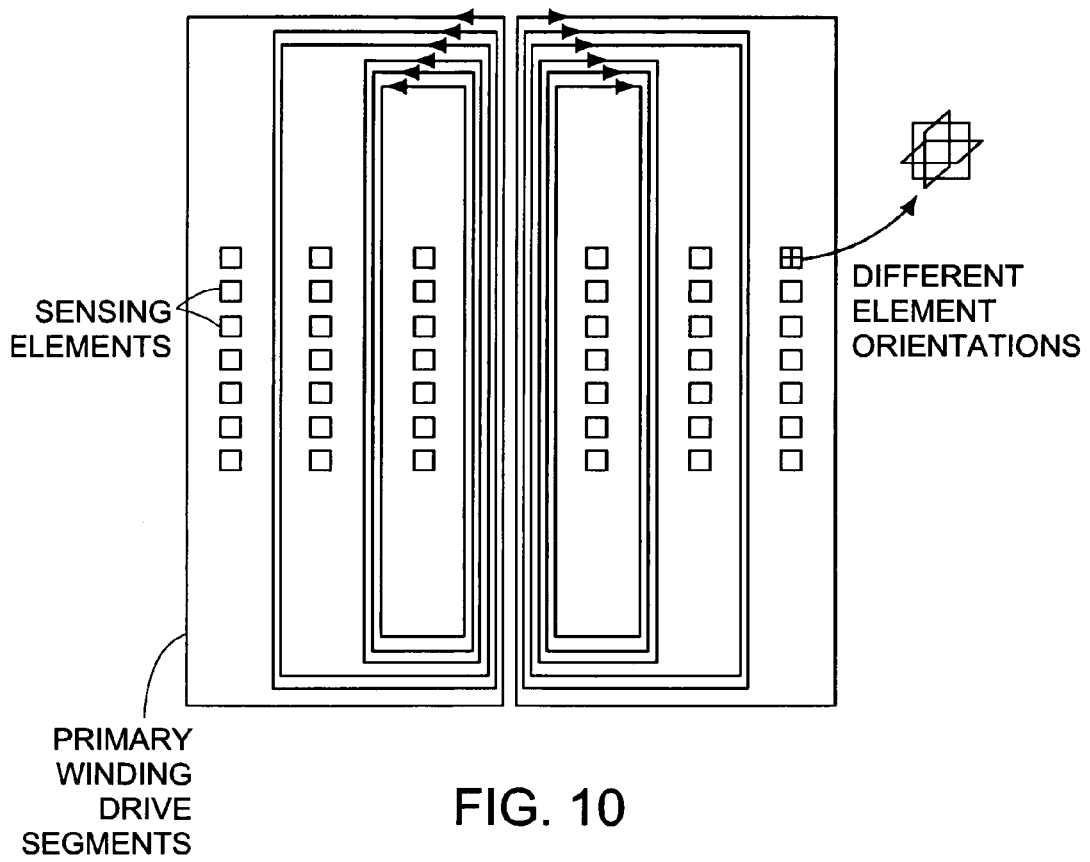
FIG. 10 is a drawing of an alternative drive winding distribution with a two-dimensional array of sense elements.

Two sensor designs that may be suitable for these measurements are shown in FIG. 9 and FIG. 10. The basic design of FIG. 9 has two simple rectangular drives with a two-dimensional array of sensing elements for measuring the field response at multiple distances from the drive winding. A single rectangular drive could also be used to make a smaller sensor, but the two rectangles provide greater symmetry and higher field intensities in the central region. In contrast, the design of FIG. 10 has a more complicated drive winding geometry, with multiple rectangular coils used to shape the field distributions. Sensing elements placed at various locations throughout the array will respond to different field orientations and provide complementary information about flaws. In both cases, the orientations of the sense elements can be adjusted to select a desired orientation of maximum sensitivity to property variations. Both of these designs have the drive and sense elements mounted onto a common support substrate so that they move together when scanned over a part. This common substrate simplifies the instrumentation and position registration of the array, but has limited spatial sampling of the field around the drive winding.

Figure 27:
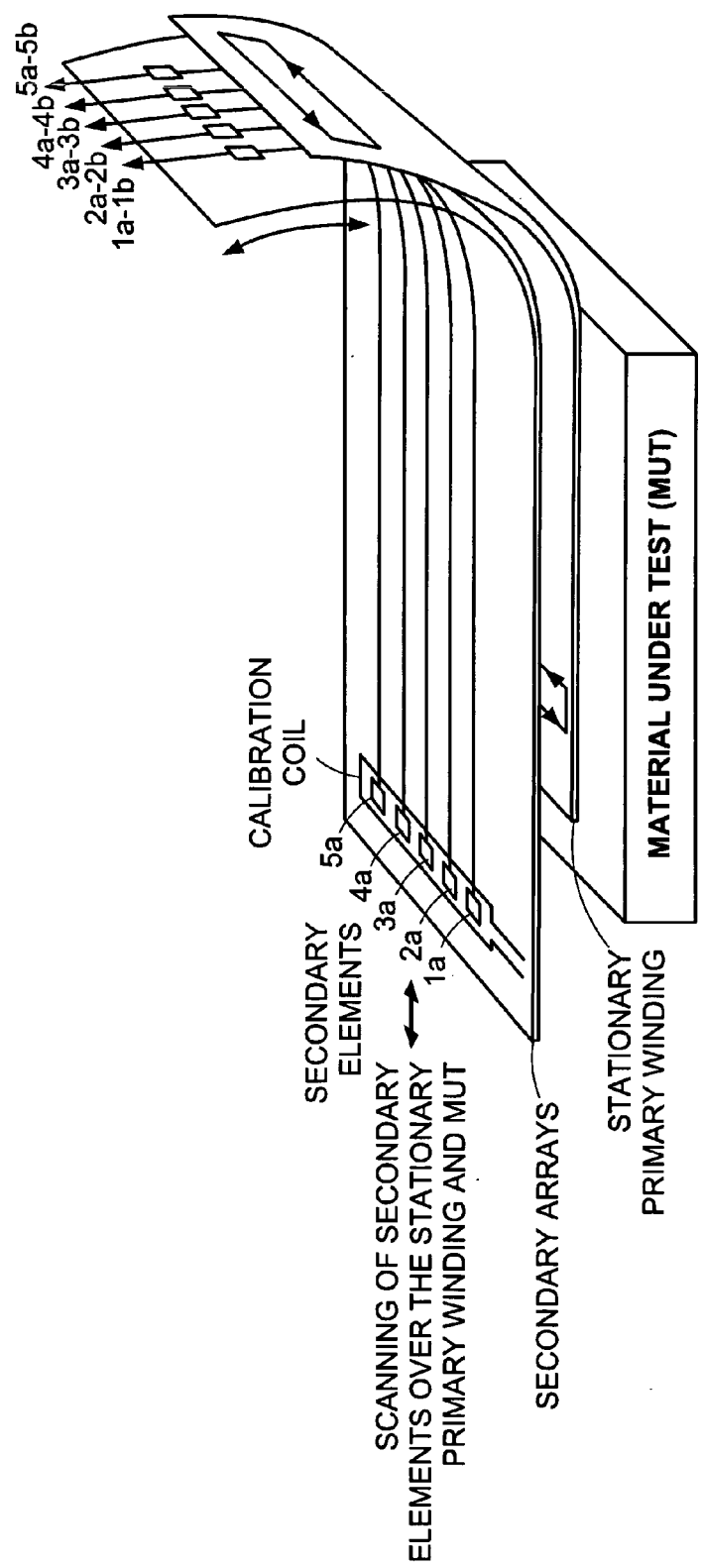
FIG. 27 shows a schematic of a sensor array for source reconstruction utilizing a stationary excitation winding and scanning array of secondary elements. The scanning array of secondary elements is connected to a second set of elements located away from the MUT and in proximity to a second identical primary winding.

Alternative designs can provide increased sensitivity to sources within the material, while allowing high measurement density (surface resolution). In order to achieve a very high resolution, a scanning technique is employed using a linear array of secondary elements. In these designs, the drive winding, e.g., a simple rectangle or a distributed winding, is held near the part while a roving array of sensing elements passes over the array and the MUT. The array of secondary elements is scanned, while the primary winding remains stationary, as shown in FIG. 27. This method allows very high data resolution in the scan direction which is determined by scan speed and acquisition rate. The resolution in the direction of the array elements is determined by the size and spacing of the elements, but can be enhanced by the addition of linear arrays at offsets or more complex two dimensional scanning of the secondary array. This should improve source reconstruction since the magnetic field measurements would be made with high spatial resolution for a given excitation. While this design allows a single linear array of sense elements to be used, it also requires accurate registration of the sense elements with respect to the drive winding.

The geometry of the primary winding can also be designed to localize the excitation such that only sources induced in a small region of the MUT need to be considered in the reconstruction for a fixed primary position. For example, the primary winding of FIG. 27 consists of a rectangular loop, where the long branches of the rectangle are separated such that a region exists between the branches where the induced sources in the MUT can be neglected. The scanning array of secondary elements is connected to a second set of elements located away from the MUT and in proximity to a second identical primary winding. The relative position of the second primary and second set of elements track that of the first to provide a dynamic nulling mechanism to enhance sensitivity. A well-modeled calibration coil is located with the main secondary elements and is utilized as a calibration reference to overcome issues typically associated with differential coils. Measurements of the fields by the scanning secondary array would typically be made in the vicinity of one of the long branches.

Figure 28:
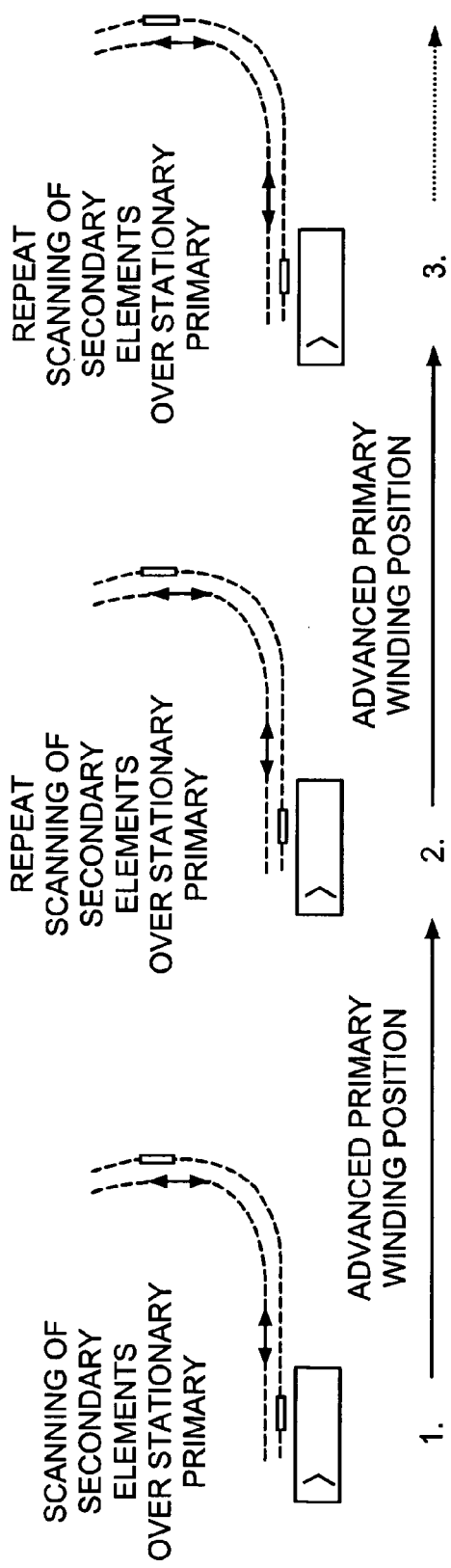
FIG. 28 illustrates an example scanning process over a MUT. With the primary stationary, the secondary array is scanned over the MUT in the vicinity of the primary winding. Then, the primary winding is advanced to a new position on the MUT and the process is repeated.

Using this type of sensor design requires a two-step scanning process to inspect the surface of the MUT. The first step involves positioning the primary near the MUT and holding it stationary while the secondary array is scanned over the MUT in the vicinity of the primary winding. The second step is to advance the primary winding to a new position on the MUT and to repeat the secondary array scanning process. This last step is repeated until the inspection is completed. This procedure is illustrated in FIG. 28.

Another issue affecting the sensor design is the sensitivity to the properties of the MUT. Sensitivity to the fields from induced sources in the material is generally reduced by the presence of fields produced directly by the primary winding. These primary fields are generally more intense near the surface, in the vicinity of the secondary elements, than the fields from the induced sources in the material. As a result, the secondary element response is dominated by these direct primary fields, reducing sensitivity to the fields from the induced sources. Therefore any measurement of fields at the surface will be mostly composed of the primary excitation field.

To increase sensitivity, it is desirable to null out the component of the secondary signal produced by the primary winding fields. Nulling this component of the secondary signal is complicated by the fact that the secondary elements are scanning and therefore the field contribution to the secondary signal is a function of the secondary element's scan position.

This can be accomplished when both a second primary winding structure and a second array of secondary elements are created away from the MUT, such that during secondary array scanning their relative position mechanically tracks that of the primary and secondary array over the MUT. Each element of the second set of secondary elements are connected to the corresponding element of the first set of secondary elements such that signal from the primary is approximately nulled.

Calibration is achieved by replacing the MUT with a non-conducting, non-permeable material and measuring the null signal as a function of secondary array scan position, which is stored for later use. A second calibration winding with a well defined structure and position relative to the secondary elements is then excited instead of the primary winding. This calibration winding should be accurately modeled such that the field in the vicinity of each secondary element can be predicted and compared with that measured to provide calibration.

The sensor functions on the MUT by scanning the secondary elements with the primary winding stationary and then advancing the primary and again scanning the secondary elements. This provides a source reconstruction for each primary position. Multiple temporal excitation frequencies can be used for the primary field providing additional source distributions for each frequency and primary position. Additional secondary elements may also be added such that differences in neighboring elements can be used to provide more precise field gradient measurements. This high resolution measurement approach then permits the source reconstruction at the various excitation frequencies and excitation positions.

Information about the object or flaw shape, size, depth, orientation, etc. can be obtained using sensor or sensor arrays that can provide measurements with various relative positions and orientations between the primary winding, the sense elements, and the object or flaw. In one embodiment of the invention, local sensor motion is provided while the cart or platform holding the sensor is stationary. This motion can include simple linear motion along the material surface, vertical motion where the lift-off distance between the sensor and the material surface is varied, rotation of the sense element so that the orientation of the sense element can be varied to enhance sensitivity to particular components of the magnetic field, and complex motions involving combinations of the other motions. The sensor can include one- or two-dimensional arrays of sense elements. The primary winding and cart can both be stationary as well, so that the sensor or sensor array is moved relative to the field created by the primary winding, so that a wealth of complementary information can be obtained about the object or flaw to aid in the three-dimensional reconstruction of the object or flaw. Of course, the motion can be performed in stages so that the primary is moved relative to the cart and then the sense elements are moved with the primary winding position held fixed.

Figure 29A:
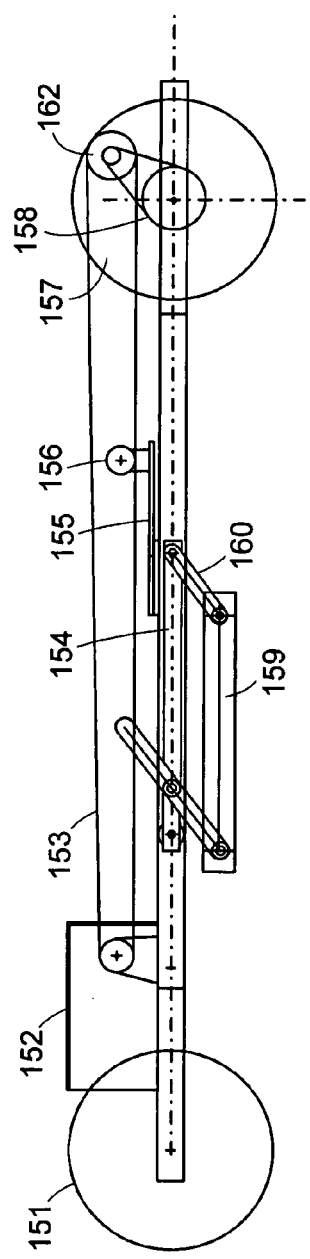
FIG. 29 is a schematic diagram of a cart that allows relative motion of the sensor array with the cart stationary.
Figure 29B:
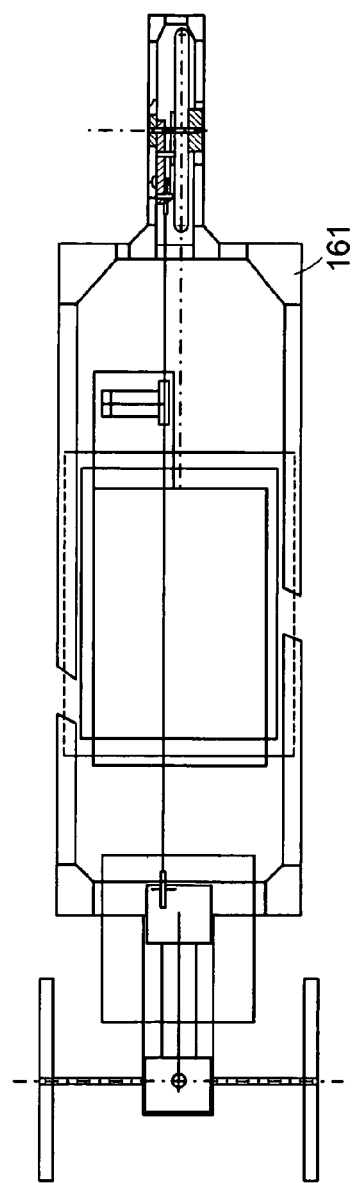

FIG. 29 illustrates a representative embodiment of the invention of such as cart or support structure design. The cart has a pair of front wheels 151 for side-to-side stability and a single rear wheel 157. The main frame for the carriage 161 has a support 152 for measurement instrumentation, which should be kept as far as possible from the sensor array to reduce undesired field responses. The sensor or sensor array 159 is attached to sliding support 154 within the main frame 161 through side supports 160. The side supports 110 allow the height of the array relative to the MUT surface to be adjusted. The sliding support 154 allows relative motion between the sensor array 159 and the main frame 161. A servo motor 156 with a pulley is mounted on a platform 155 for mechanically controlling the scan speed of the cart. A wire rope transmission line 153 connects the motor to the pulley 162, which in turn is connected to an angular speed multiplier 158. Preferably, both the pulley 162 and multiplier 158 have a diameter one-quarter of the rear wheel 157 diameter. In a preferred embodiment of the invention, the main frame 161 and other support structures are made of materials that have a minimal impact on the sensor response. For an MQS sensor, these materials are nonmagnetic and electrically insulating. As an example alternative embodiment of the invention, an additional adjustment can be included so that the sense element position can also be adjusted independent of the position of the drive winding and the cart.

In an alternative embodiment of the invention electric field sensors, the interdigitated electrode dielectrometers (IDEDs) described in U.S. Pat. Nos. 4,814,690 and 6,380,747 and in U.S. patent application Ser. No. 10/040,797, filed Jan. 7, 2002, and Ser. No. 10/225,406, filed Aug. 20, 2002, the entire teachings of which are hereby incorporated by reference, can be used to inspect poorly conducting or insulating dielectric materials, such as adhesives, epoxies, glass, oil, plastics, and fiberglass composites in single or multiple layered media. Here the conductivity and dielectric constant or complex permittivity and layer thicknesses are measured using the same methods as for magnetic field sensing.

Figure 30:
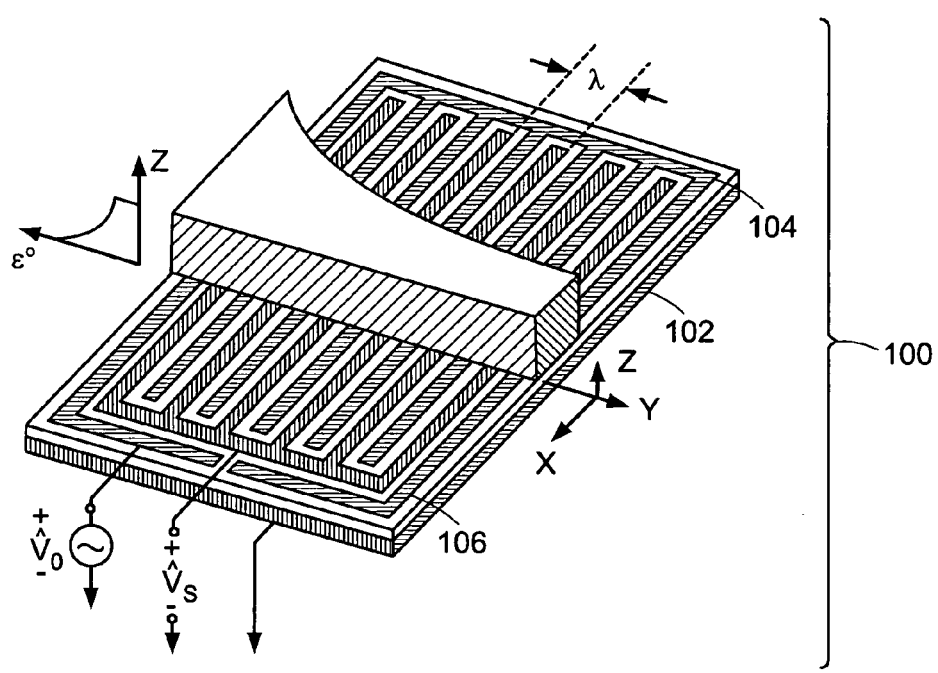
FIG. 30 is a representative single wavelength interdigitated electrode dielectrometer with spatially periodic driven and sensing electrodes of wavelength 1 that can measure dielectric properties of the adjacent material.

These EQS sensors are the electromagnetic dual to the inductive sensors, with electric fields taking the place of magnetic fields for inspecting the materials. A representative single sided sensor geometry is shown in FIG. 30. The application of a sinusoidally varying potential of complex magnitude v and angular frequency $\omega=2\pi f$ results in the flow of a terminal current with complex amplitude I, whose magnitude and phase is dependent on the complex permittivity of the material. The capacitive sensor 100 in one preferred embodiment has interdigitated electrodes. This sensor 102 utilizes a pair of interdigitated electrodes 104 and 106 to produce a spatially periodic electric field. The electrodes are adjacent to the material of interest with an insulating substrate and a ground plane on the other side of the substrate. One of the two electrodes, 104, is driven with a sinusoidally varying voltage, $v_D$, while the other, 106, is connected to a high-impedance buffer used to measure the magnitude and phase of the floating potential $v_S$. The periodicity of the electrode structure is denoted by the spatial wavelength $\lambda=2\pi/k$, where k is the wavenumber.

Figure 31:
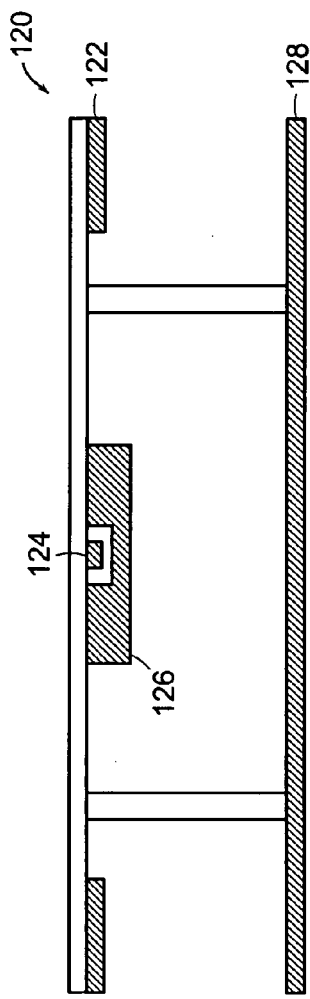
FIG. 31 illustrates a single sensing electrode dielectrometer.

An alternative embodiment of the invention to the IDED sensor is a sensor that has a single sensing electrode, or a single location for a sensing electrode, and excites only one period of the electric field. This design is more appropriate for non-portable sensors. A multiple wavelength (periodic) version of this sensor could be used for vehicle mounted applications. The basic single sensing electrode sensor 120 design as illustrated in FIG. 31 consists of two excitation electrodes 122, a sensing electrode 124, a guard electrode 126 and a shielding plane 128. The excitation electrodes 122 are driven by a high voltage source which is typically sinusoidal (500V peak in experiments). Electric field lines emanate from the excitation electrodes and fringe through the half-space above and below the face of the sensor, terminating on the shielding plane 128, guarding electrode 126 and sensing electrode 124. In the preferred approach, the primary sensing electrode 124 is held at a voltage potential equivalent to that of the shield and guard, which is typically a ground reference, while the current required to maintain this sensing electrode voltage is measured. Alternatively, the sensing electrode could be allowed to float, its voltage being detected. Keeping both the sense electrode and shield/guard electrodes at identical voltages effectively eliminates the capacitive coupling between these electrodes. Such coupling can result in signal attenuation and sensitivity loss, since it is the coupling between the sense electrode and excitation electrodes that is of interest.

The ratio of excitation voltage to the current flowing to and from the sensing electrode, also known as the transimpedance, is then used as the sensor output. The output is compared with the response from both finite element and analytical models of the sensor and its surroundings to determine material or geometric properties of the surroundings. The output during scanning is compared with the output with no buried objects present when used to detect changes in the surroundings over position or time. The overall structure is driven by the desire to induce dielectric polarization in materials which are not locatable directly between electrodes, but rather materials which are in a half-space region separated from all electrodes in the adjacent half-space. In order to accomplish this, fringing electric fields are setup by electrodes held at two different voltage potentials and placed in the plane separating half-spaces. The use of two excitation electrodes at the same potential adds a degree of symmetry to the fields, while placing the sensing electrode at the center eliminates disturbances from unwanted interference as a result of the protection from the shielding plane. The use of a single excitation electrode permits deeper sensor penetration with the same size footprint. In terms of electric field distribution, the sensing electrode and guard shield can be viewed as a single electrode since they are at the same voltage potential. The spatial distribution of the fringing fields is then primarily determined by the excitation electrode and sense/guard shield electrode size and position in the plane of the sensor face. From closed form 2-D Laplacian solutions for electric fields with periodic boundary conditions it is known that the electric field intensity will decay into the half-space of proximate dielectric material. It is also known that boundary conditions on potential having lower spatial frequencies will result in a slower rate of decay of electric field intensity with distance from the electrode plane. This fact is utilized in the aperiodic structure by separating excitation and guard/sense electrodes until practical sensor size limitations are reached, thereby increasing the low frequency spatial spectral content of the boundary potential at the sensor's face. The gap between electrodes and electrode widths have been chosen so that the potential at the boundary approximates that of a single period of a sinusoid in order to minimize higher spatial harmonics which will cause an undesirably faster decay of the relative electric field intensity. Placing the shield plane too close to the face of the sensor also tends to create higher order harmonics and is therefore placed as far as practical from the sensor face. All of these efforts are aimed at increasing the relative electric field intensity as deep as possible into the half-space being probed. However, having sufficient field intensity at a desired probing depth into the half-space is necessary but not sufficient in being sensitive to the materials located there. Further attention must be given to the design of the sense electrode and guard.

Figure 32:
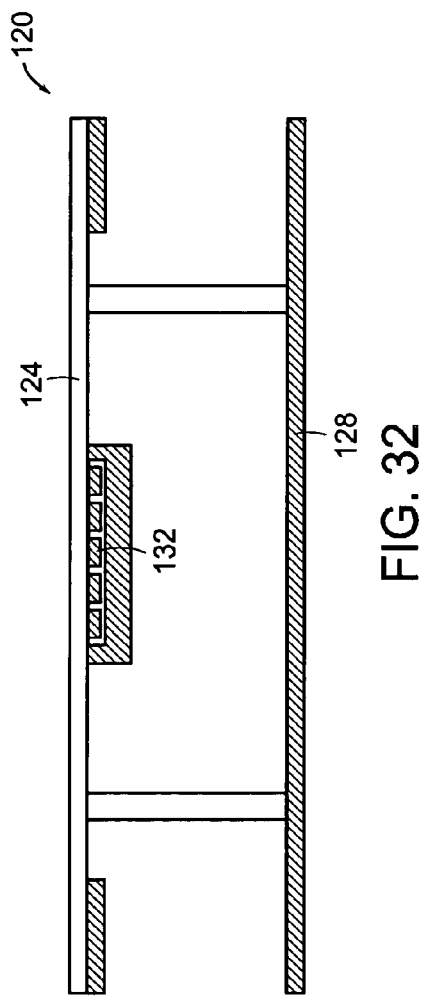
FIG. 32 is a cross section of a sensor with multiple sensing elements positional side-by-side for multiple depths.

Additional imaging capability may also be achieved by further breaking the original single sensing electrode 124 in separate parts as shown in FIG. 32, giving further information about depth of objects in the half-space being probed. This sensor 120 utilizes a single column of a plurality of sensing side-by-side elements 132. In preferred embodiments, there are three or five elements. The center sensing electrode of FIG. 32 senses the longest and deepest spatial half wavelengths, while end electrodes sense shorter, shallower half wavelengths.

Figure 33:
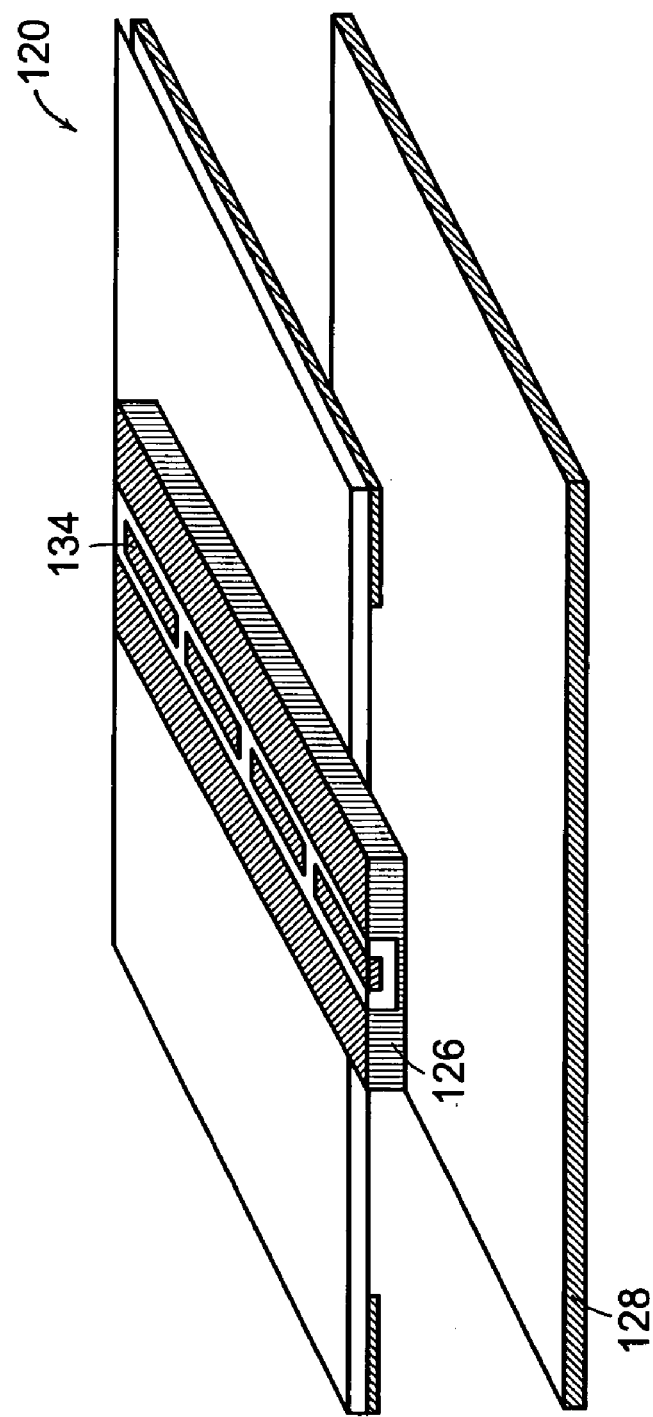
FIG. 33 is a perspective view of a sensor with a multiple sensing elements positioned in-line.

Breaking the sensing electrode up into separate elements along what has been the depth of the cross-section as depicted in FIG. 33 allows for imaging of the half-space being probed. This sensor 120 utilizes a single row of four sensing elements 134 surrounded by the guard electrode 126. A pair of drive electrodes are located on either side. The four sensing electrodes can be connected differently such that three outputs are produced which are proportional to differences in adjacent electrodes. In a preferred embodiment of the invention numerous (e.g. 20 sensing elements will be used in a row to increase image resolution). Without the side sensing elements of the previous embodiments, this sensor does not include air gap compensation capability. When the output of each element is directly used as information in building an image, results similar to scanning a single element will be obtained. The array of elements excels when utilized with additional circuitry, which differences the measurements from adjacent or alternating elements. Differencing the elements allows for additional sensitivity to small, but spatially abrupt (with respect to the spacing of the elements being differenced) changes in the dielectric properties in the half-space, as is the case when searching for objects such as landmines. With the sensor stationary a one-dimensional image is formed by numerically integrating the measured differences after their conversion from analog signals to digital values. By scanning the array in a direction perpendicular to the line of array elements two-dimensional images may be formed by combining the one-dimensional image at each position of the scan. Here incorporating an absolute measurement (i.e., not differential) of one or more of the elements at each scan position can be useful in accounting for variations in the sensor lift-off when scanning over a surface. Additional information from electrodes sensitive to properties at various depths as described in the previous section may also be incorporated for improved object discrimination and three-dimensional imaging. A full two dimensional array combining the features of FIGS. 32 and 33 may also be provided. Representative applications of these sensor arrays includes scanning across the surface of interest to monitor or inspect both the internal geometric features and surface geometry features. Examples of internal geometric features for reinforced composite materials, such as graphite, glass, silicon carbide or metal fiber composites, are density, locations, alignment, properties, coating degradation, Marselling (i.e., waviness), orientation, flatness, and bond integrity between layers. An example surface geometric feature is the topology required for functional performance, such as sand paper grit sizes, tire tread geometry and depth, and surface roughness for no slip surfaces. In particular, high resolution capacitive arrays are used, in some cases with segmented field sensing element arrays, to produce images of tire treads specifically to replace costly and time consuming visual inspection for rework repair decision support as well as for new tire manufacturing quality control. The air gap or lift-off between the sensor and the MUT can be an unknown property to be determined, which permits determination of the properties of interest without contacting the MUT surface. Alternatively, the sensor can also be placed in contact with the surface of the MUT. In some other applications periodic measurements need to be performed on a given area of material. This can be accomplished with permanently mounted sensors. Preferably, the sensors are mounted in such a way as to leave an air gap between the sensor and the MUT or with a perforated support structure so that the presence of the diagnostic sensor does not interfere with the process being monitored. As an example, a permanently mounted sensor in an autoclave can be used to monitor the cure state of individual components, including detection of the end of cure. Furthermore, the output of signal from dielectric sensors (single sensing element or arrays) is used as input for control of catalysts or other actuation mechanisms, such as blue light, ultraviolet light, or speed through an oven or autoclave, to affect cure rates.

The MQS and EQS sensor arrays can also be used in combination together, as disclosed in U.S. patent application Ser. No. 5,453,689 filed Dec. 6, 1991. High resolution inductive and capacitive sensing elements can be used in conjunction with a single drive winding or electrode. Alternatively, independent magnetic field drive windings and electric field generating electrodes are used to interrogate the material/object of interest. High resolution one or two dimensional arrays of sensing elements are then used to generate images.

As a specific application, combinations of magnetic and electric field sensors are used in a process flow configurations to track and monitor the materials in a tire from raw materials through new tire manufacturing and rework and repair for the life of the tire. Associated with these measurements, databases of individual tire condition, as well as fleet and individual vehicle usage, can be accumulated and monitored to extend life and provide customer service. This information represents both absolute properties of materials and trends and individual tire imaging information. This database supports fleet wide tire usage efficiency and health management of the fleet. This information can is also combined with individual and fleetwide usage, as well as past failure in-service, information to anticipate failures. The fleet usage information and monitoring of pressure variations and other such information during service or testing is combined with magnetic and electric field interrogation information to predict remaining life or probability of failure before the next inspection opportunity. The information from disparate locations is combined into a central database.

Similarly, images of metal matrix composites are provided by the high resolution arrays. The images can be obtained by scanning a linear array, multiple segmented field arrays or multiple sensing element orientations relative to the drive plane. This allows the properties of the fibers and the matrix material to be captured and to the composite quality or aging. In particularly the measurement system can be used to inspect multiple munitions made of metal matrix composite shell casings for quality. For improved efficiency, several MWM-Arrays are used to inspect multiple munitions simultaneously.

While the inventions have been particularly shown and described with reference to preferred embodiments thereof, it will be understood to those skilled in the art that various changes in form and details may be made therein without departing from the spirit and scope of the invention as defined by the appended claims.

References incorporated by reference in their entirety:

H. A. Haus and J. R Melcher, "Electromagnetic Fields and Energy," Prentice Hall, Englewood Cliffs, N.J., 1989.

The following references are incorporated herein by reference in their entirety.

1. SERDP Proposal, titled "High Resolution Inductive Sensor Arrays for UXO Detection, Identification and Clutter Suppression," SON Number UXSON-02-03, dated Apr. 17, 2002.
2. Air Force Phase I Proposal, titled "Capacitive and Inductive Arrays for Metallic and Non-Metallic Object Imaging," Topic #NAF-03-123, dated Jan. 14, 2003.
3. Air Force Phase II Proposal, titled "Three Dimensioanl Magnetic Imaging of Damage in Multiple Layer Aircraft Structures," Topic #AF02-281, dated Feb. 20, 2003.
4. Navy Phase I Proposal, titled "Observability Enhancement and Uncertainty Mitigation for Engine Rotating Component PHM," Topic #N02-188, dated Aug. 14, 2002.
5. Technical Report titled "High Resolution Inductive Sensor Arrays for UXO Detection, Identification and Clutter Suppression," SERDP Base Program Final Report, dated Apr. 15, 2003.
6. Technical presentation titled "High Resolution Inductive Sensor Arrays for UXO Detection, Identification and Clutter Suppression," presented to the SERDP Scientific Advisory Board, Jun. 11, 2002.
7. Technical paper titled "High Resolution Inductive Sensor Arrays for UXO Detection, Identification and Clutter Suppression," SPIE AeroSense Conference, Orlando, Fla., Apr. 23, 2003.
8. Technical presentation titled "High Resolution Inductive Sensor Arrays for UXO Detection, Identification and Clutter Suppression," In-Progress Review meeting for SERDP, May 14, 2003.
9. Technical paper titled "MWM Eddy Current Sensor Array Imaging of Surface and Hidden Corrosion for Improved Fleet Readiness and Cost Avoidance," presented at U.S. Army Corrosion Conference, Clearwater Beach; Fla., Feb. 11-13, 2003.
10. Technical paper titled "MWM Eddy Current Sensor Array Characterization of Aging Structures Including Hidden Damage Imaging," presented at the NACE Conference, San Diego; Calif., Mar. 17-19, 2003.
11. Technical paper titled "Material Condition Monitoring Using Embedded and Scanning Sensors for Prognostics," presentation at the 57th MFPT Conference, Virginia Beach, Va.; April 2003.
12. Technical paper titled "Nondestructive Evaluation for CBM and PHM of Legacy and New Platforms," 57th MFPT Conference, Virginia Beach, Va.; April 2003.
13. Technical paper titled "Validation of Multi-Frequency Eddy Current MWM Sensors and MWM-Arrays for Coating Production Quality and Refurbishment Assessment," submitted for the proceedings of the ASME/IGTI Turbo conference, June 2003, Atlanta, Ga.
14. Technical paper titled "Corrosion Detection and Prioritization Using Scanning and Permanently Mounted MWM Eddy-Current Arrays", Tri-Service Corrosion Conference, January 2002.
15. Technical paper titled "MWM-Array Characterization and Imaging of combustion Turbine Components," presented at EPRI International Conference on Advances in Life Assessment and Optimization of Fossil Fuel Power Plants, March 2002.
16. Technical paper titled "Absolute Electrical Property Imaging using High Resolution Inductive, Magnetoresistive and Capacitive Sensor Arrays for Materials Characterization," presented at 11th International Symposium on Nondestructive Characterization of Materials, Berlin, Germany; June, 2002.
17. Technical paper titled "High-Resolution, Deep Penetration and Rapid GMR/Eddy Current Array Imaging of Weld Condition and Quality" presented at ASNT Structural Materials Technology—NDE/NDT for Highways and Bridges, September 2002.
18. Technical paper titled "Multi-Site Damage Imaging of 3rd Layer Cracks in Lap Joints using MWM-Arrays," presented at the 6th Joint FAA/DoD/NASA Aging Aircraft Conference, September, 2002.

What is claimed is:

1. A test circuit comprising:
a primary winding having at least one linear segment to impose a magnetic field in a test material when driven by an electric current;
at least two sense elements positioned parallel to a linear primary winding segment; and
a bucking coil proximate to and surrounding the sense elements and driven by an electric current so that a local magnetic field opposes the imposed field.

2. A test circuit as claimed in claim 1 wherein the sensing elements are inductive to sense a time varying magnetic flux.

3. A test circuit as claimed in claim 2 wherein the sensing elements are absolute measurement coils.

4. A test circuit as claimed in claim 3 wherein the sensing elements are differential measurement coils.

5. A test circuit as claimed in claim 1 wherein at least one sense element has a giant magnetoresistive sensor.

6. A test circuit as claimed in claim 1 wherein the bucking coil is driven in series with the primary winding.

7. A test circuit as claimed in claim 6 wherein the current through the bucking coil is attenuated with passive circuit elements.

8. A test circuit as claimed in claim 7 wherein the passive element is a resistor.

9. A test circuit as claimed in claim 1 wherein the bucking coil is driven separately from the primary winding.

10. A test circuit as claimed in claim 1 wherein the local magnetic field in the vicinity of the sense elements is nulled.

11. A test circuit as claimed in claim 1 further comprising a calibration coil located in the vicinity of the sense elements.

12. A test circuit as claimed in claim 11 wherein the calibration coil spans the area over the sense elements.

13. A test circuit comprising:
a primary winding having at least one linear segment to impose a magnetic field in a test material when driven by an electric current;
at least two sense elements positioned parallel to a linear primary winding segment;
a calibration coil located in the vicinity of the sense elements and spanning the area over the sense elements; and
a bucking coil proximate to the sense elements and driven by an electric current so that a local magnetic field opposes the imposed field.

14. A test circuit as claimed in claim 13 wherein the sensing elements are inductive to sense a time varying magnetic flux.

15. A test circuit as claimed in claim 14 wherein the sensing elements are absolute measurement coils.

16. A test circuit as claimed in claim 15 wherein the sensing elements are differential measurement coils.

17. A test circuit as claimed in claim 13 wherein at least one sense element has a giant magnetoresistive sensor.

18. A test circuit as claimed in claim 13 wherein the bucking coil surrounds the sense elements.

19. A test circuit as claimed in claim 13 wherein the bucking coil is driven in series with the primary winding.

20. A test circuit as claimed in claim 19 wherein the current through the bucking coil is attenuated with passive circuit elements.

21. A test circuit as claimed in claim 20 wherein the passive element is a resistor.

22. A test circuit as claimed in claim 13 wherein the bucking coil is driven separately from the primary winding.

23. A test circuit as claimed in claim 13 wherein the local magnetic field in the vicinity of the sense elements is nulled.

* * * * *